United States Patent [19]

Morita et al.

[11] Patent Number: 5,267,141

[45] Date of Patent: Nov. 30, 1993

[54] MACHINING UNIT APPLICATION CONTROL APPARATUS AND METHOD EMPLOYING DATA FROM SEVERAL DIFFERENT OPERATIONS

[75] Inventors: Atsushi Morita; Yoshihito Imai; Akio Noda; Hisaichi Maruyama, all of Hyogo; Yoshifumi Nanasawa, Aichi, all of Japan

[73] Assignee: Mitsubishi Denki K.K., Tokyo, Japan

[21] Appl. No.: 476,427

[22] PCT Filed: Oct. 6, 1989

[86] PCT No.: PCT/JP89/01026

§ 371 Date: Aug. 6, 1990

§ 102(e) Date: Aug. 6, 1990

[87] PCT Pub. No.: WO90/03866

PCT Pub. Date: Apr. 19, 1990

[30] Foreign Application Priority Data

Oct. 7, 1988 [JP] Japan ............... 63-252137

[51] Int. Cl.⁵ ................... G06F 15/46; B23H 1/00
[52] U.S. Cl. ................... 364/152; 364/474.04; 395/61; 395/900; 395/904; 219/69.13; 219/69.16
[58] Field of Search ............. 364/513, 130–194, 364/474.01–474.34; 395/50–77, 900–904; 219/69.16, 69.13

[56] References Cited

U.S. PATENT DOCUMENTS

| 4,628,434 | 12/1986 | Tashiro et al. | 364/148 |
| 4,740,886 | 4/1988 | Tanifuji et al. | 364/148 |
| 4,752,890 | 6/1988 | Natarzjan et al. | 364/148 |
| 4,754,410 | 6/1988 | Leech et al. | 364/148 |
| 4,864,490 | 9/1989 | Nomoto et al. | 364/162 |
| 4,985,824 | 1/1991 | Husseiny et al. | 364/187 |
| 5,006,992 | 4/1991 | Skeirik | 364/148 |
| 5,012,430 | 4/1991 | Sakurai | 364/148 |
| 5,117,083 | 5/1992 | Kawamura | 219/69.16 |
| 5,189,621 | 2/1993 | Onari et al. | 364/148 |
| 5,200,905 | 4/1993 | Vemoto et al. | 364/474.04 |

FOREIGN PATENT DOCUMENTS 59-8496 2/1984 Japan.
63-62001 3/1988 Japan.

OTHER PUBLICATIONS

Stephen Chiv and Masaki Togai, "A Fuzzy Logic Programming Environment for Real-Time Control", Aug. 1988.

Yoshiro Sakai and Kitao Ohkusa, "On a Control System for Cutting process", 1984.

Journal of The Society of Instrument and Control Engineers, vol. 22, pp. 84–86, 1983.

Primary Examiner—Jerry Smith
Assistant Examiner—Jim Trammell
Attorney, Agent, or Firm—Sughrue, Mion, Zinn, Macpeak & Seas

[57] ABSTRACT

In an application control apparatus or method for a machining unit such as an electric discharge machine, a plurality of methods of realizing desirable machining states such as those on machining know how techniques are independently described and stored as knowledge, and control is carried out according to the methods thus stored, whereby the machining unit is maintained in desirable state at all times.

10 Claims, 30 Drawing Sheets

FIG. 7

METHOD 1: IN CASE OF MOVING A MINIMUM POINT UPWARDLY FOR A PERIOD NOT LONGER THAN 0.5 SEC, AN ELECTRODE PULL-UP DISTANCE IS INCREASED AS FOLLOW.

| UPWARD MOVEMENT AMOUNT OF MIN. POINT | NOT HIGHER THAN 2 μ | 2 ~ 10 μ | NOT LOWER THAN 10 μ |
|---|---|---|---|
| INCREMENT OF PULL-UP DISTANCE | 0 | 1 STEP | 2 STEP |

METHOD 2: VARY AN ELECTRODE PULL-UP DISTANCE ACCORDING TO NO-LOAD DISTRIBUTION DENSITY VARIATION RATE.

| DISTRIBUTION DENSITY VARIATION RATE | NOT HIGHER THAN 0.8 | 0.8 ~ 1.2 | NOT LOWER THAN 1.2 |
|---|---|---|---|
| VARIATION IN PULL-UP DISTANCE | −1 STEP | 0 | +1 STEP |

$$\text{DISTRIBUTION DENSITY VARIATION RATE} = \frac{(D_I / D_{II})_n}{(D_I / D_{II})_{n-1}} \quad \cdots \cdots (5)$$

$D_I$ : FREQUENCY OF NO-LOAD TIME SMALLER THAN A PROPER VALUE
$D_{II}$ : FREQUENCY OF PROPER NO-LOAD TIME
$(\ )_n$ : VALUE IN PERIOD n
NO-LOAD TIME: A PERIOD OF TIME FROM APPLICATION OF VOLTAGE BETWEEN AN ELECTRODE AND A WORKPIECE TO START OF DISCHARGE

FIG. 9

METHOD 2a: IF NO-LOAD TIME DISTRIBUTION DENSITY VARIATION RATE IS NOT HIGHER THAN 0.8, DECREASE THE DEGREE OF ELECTRODE PULL-UP DISTANCE BY ONE STEP.

METHOD 2b: IF NO-LOAD TIME DISTRIBUTION DENSITY VARIATION RATE IS WITHIN A RANGE OF 0.8 TO 1.2, DO NOT VARY THE DEGREE OF ELECTRODE PULL-UP DISTANCE.

METHOD 2c: IF NO-LOAD TIME DISTRIBUTION DENSITY VARIATION RATE IS NOT LOWER THAN 1.2, INCREASE THE DEGREE OF ELECTRODE PULL-UP DISTANCE BY ONE STEP.

N: NUMBER OF METHODS

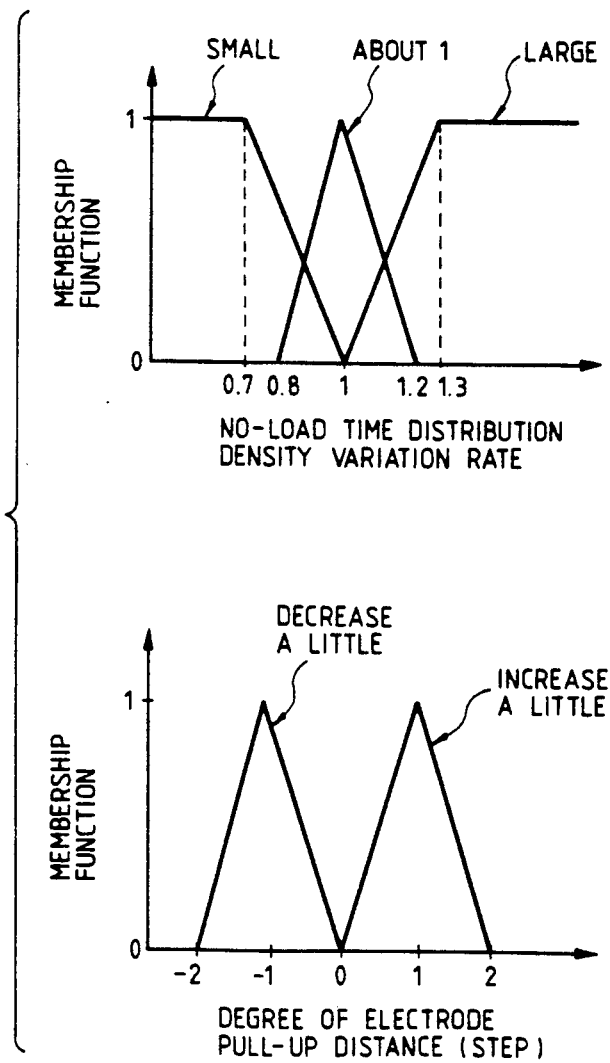

FIG. 12

RULE 1a: IF THE RISE OF MINIMUM POINT CONTINUES FOR A PERIOD OF TIME LONGER THAN 0.5 SEC AND THE DEGREE IS NOT LARGER THAN 2μ, MAINTAIN THE DEGREE UNCHANGED.

RULE 1b: IF THE RISE OF MINIMUM POINT CONTINUES FOR A PERIOD OF TIME LONGER THAN 0.5 SEC AND THE DEGREE IS WITHIN A RANGE OF 2 TO 10μ, INCREASE ELECTRODE PULL-UP DISTANCE BY ONE STEP.

RULE 1c: IF THE RISE OF MINIMUM POINT CONTINUES FOR A PERIOD OF TIME LONGER THAN 0.5 SEC AND THE DEGREE IS NOT SMALLER THAT 10μ, INCREASE ELECTRODE PULL-UP DISTANCE BY TWO STEPS.

RULE 2a: IF NO-LOAD TIME DISTRIBUTION DENSITY VARIATION RATE IS NOT HIGHER THAN 0.8, DECREASE ELECTRODE PULL-UP DISTANCE BY ONE STEP.

RULE 2b: IF NO-LOAD TIME DISTRIBUTION DENSITY VARIATION RATE IS WITHIN A RANGE OF 0.8 TO 1.2, MAINTAIN ELECTRODE PULL-UP DISTANCE UNCHANGED.

RULE 2c: IF NO-LOAD TIME DISTRIBUTION DENSITY VARIATION RATE IS NOT SMALLER THAN 1.2, INCREASE ELECTRODE PULL-UP DISTANCE BY ONE STEP.

$$\text{DISTRIBUTION DENSITY VARIATION RATE} = \frac{(D_I / D_{II})_n}{(D_I / D_{II})_{n-1}} \quad \ldots (2)$$

$D_I$: FREQUENCY OF NO-LOAD TIME SMALLER THAN A PROPER VALUE
$D_{II}$: FREQUENCY OF PROPER NO-LOAD TIME
$(\ )_n$: VALUE IN PERIOD n
NO-LOAD TIME: A PERIOD OF TIME FROM APPLICATION OF VOLTAGE BETWEEN AN ELECTRODE AND A WORKPIECE TO START OF DISCHARGE

FIG. 14

< METHOD 1 >
IF MACHINING CURRENT IS LARGE, CLEARANCE IS SMALL AND MACHINING DEPTH IS DEEP, MAKE JUMPING DISTANCE LAGER.

< METHOD 2 >
IF MACHINING CURRENT IS SMALL, CLEARANCE IS LARGE AND MACHINING DEPTH IS SMALL, MAKE JUMPING DISTANCE SMALL.

．
．
．

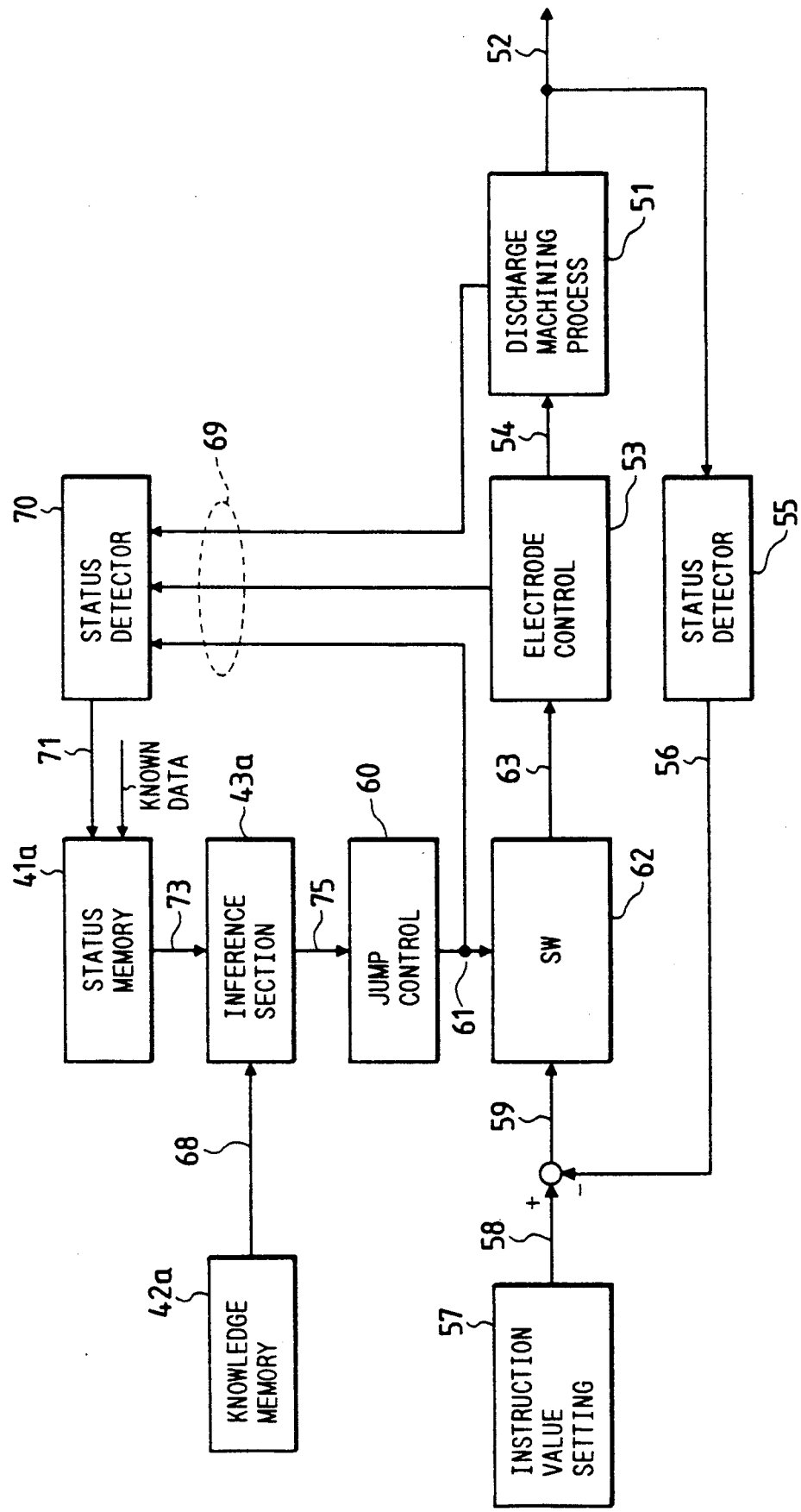

FIG. 18(a)

① WHEN MACHINING SPEED IS LOW, ADD MACHINING CONDITION A.
② WHEN MACHINING NOISE IS LARGE, DELETE MACHINING CONDITION A.
③ COMBINE THE ① AND ②.
④ THE DEGREE OF INCREASE OR DECREASE VARIES ACCORDING TO MACHINING CONDITION B.

FIG. 18(b)

(OPERATION) = $K_1 \cdot$ (MACHINING SPEED) + $K_2 \cdot$ (MACHINING NOISE) + $K_3$

| CONDITION B | $K_1$ | $K_2$ | $K_3$ |
|---|---|---|---|
| 3 | $-1$ | $-\frac{3}{2}$ | 6 |
| 4 | $-\frac{2}{3}$ | $-1$ | 4 |
| 5 | $-\frac{1}{3}$ | $-\frac{1}{2}$ | 2 |

(MACHINING CONDITION A) ← (OPERATION)

FIG. 18(c)

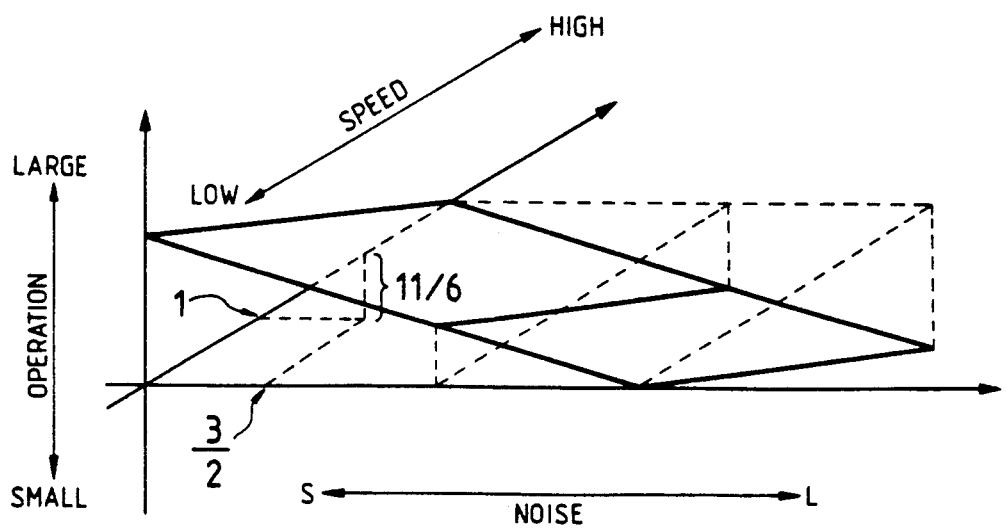

FIG. 19(a)

| MACHINING CONDITION B | MACHINING SPEED | MACHINING NOISE | INFERENCE VALUE y | OPERATOR |
|---|---|---|---|---|
| 3 | 1 | $\frac{2}{3}$ | 4 | 4 |
| 3 | 1 | $\frac{4}{3}$ | 3 | 3 |
| 3 | 2 | $\frac{4}{3}$ | 2 | 2 |
| 3 | $\frac{1}{2}$ | $\frac{1}{3}$ | 5 | 7 |
| 3 | 1 | $\frac{2}{3}$ | 4 | 6 |
| 3 | 2 | $\frac{2}{3}$ | 3 | 5 |

FIG. 19(b)

(OPERATION) = $K_1 \cdot$ (MACHINING SPEED) + $K_2 \cdot$ (MACHINING NOISE) + $K_3$

| CONDITION B | $K_1$ | $K_2$ | $K_3$ |
|---|---|---|---|
| 3 | $-1$ | $-\frac{3}{2}$ | 7 |
| 4 | $-\frac{2}{3}$ | $-1$ | 4 |
| 5 | $-\frac{1}{3}$ | $-\frac{1}{2}$ | 2 |

(MACHINING CONDITION A) ← (OPERATION)

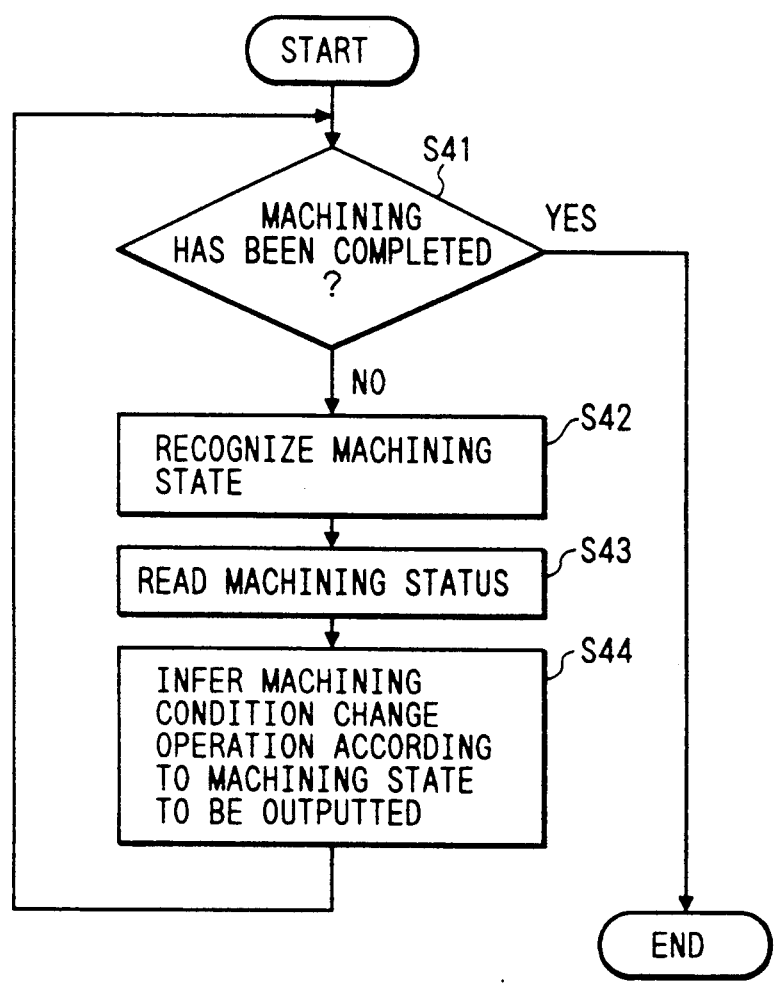

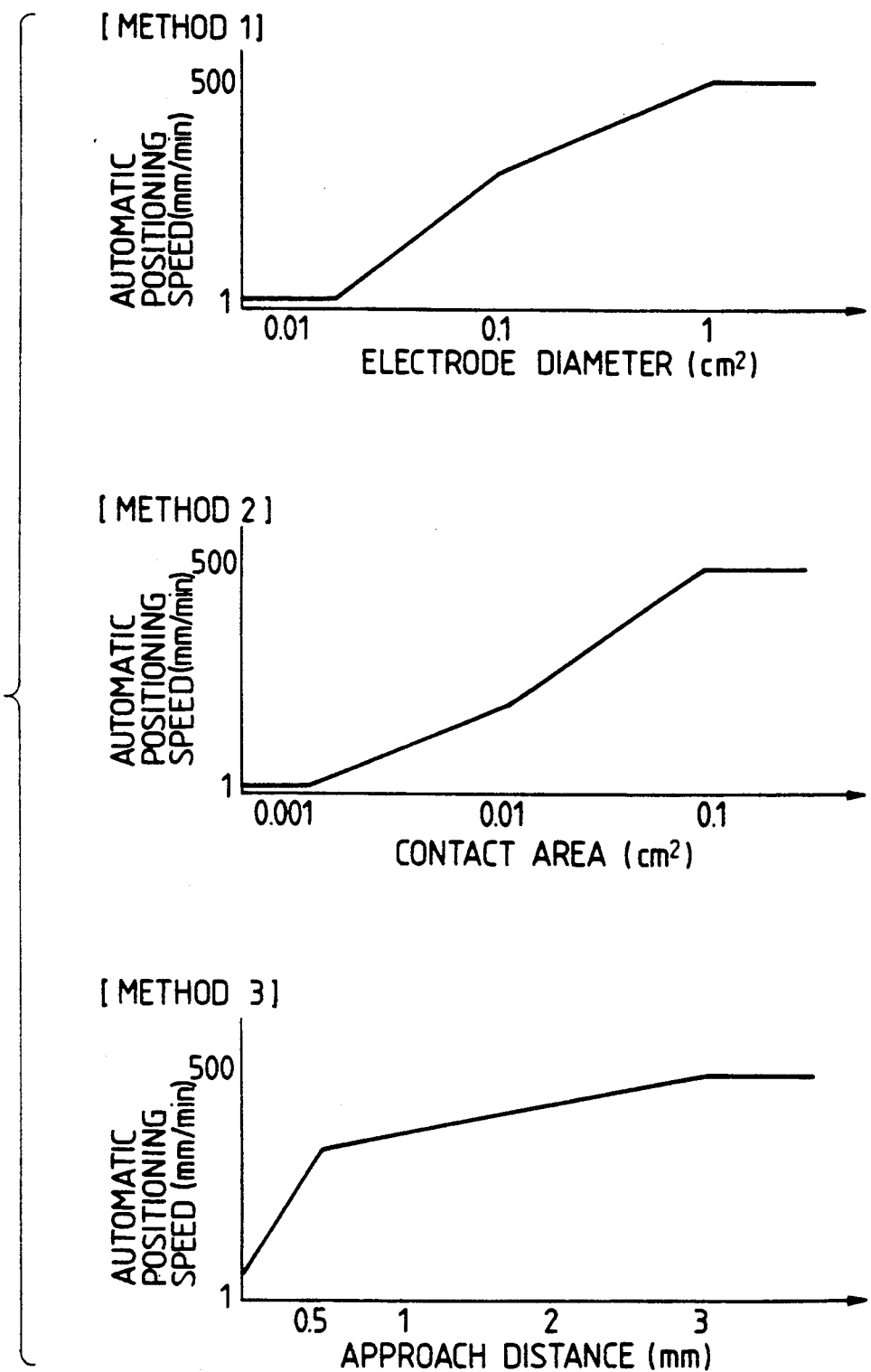

MACHINING UNIT APPLICATION CONTROL APPARATUS AND METHOD EMPLOYING DATA FROM SEVERAL DIFFERENT OPERATIONS

TECHNICAL FIELD

This invention relates to application control apparatuses for a variety of machining units (hereinafter referred to as "machining unit application control apparatuses", when applicable), and more particularly to a machining unit application control apparatus in which a plurality of method of obtaining desirable machining states such as those on machining know how techniques are stored as knowledge bases independently, and desirable machining states are held with ease by performing controls according to the methods thus stored.

The invention relates further to a machining unit application control apparatus in which methods can be readily added, and modified, and which can be used by a plurality of machining units in common.

The invention relates further to a machining unit application control apparatus which, in an electric discharge machining operation, maintains the discharge machining condition most suitable, and realizes the jumping operation of a machining electrode in such a manner as to maximize the discharge machining efficiency.

The invention relates to a machining unit application control apparatus in which, during machining methods of an operator are collected, and an automatic machining operation is carried out according to the machining methods thus collected.

The invention relates further to an automatic positioning control device for an electric discharge machine, and more particularly to a machining unit application control apparatus in which a plurality of methods are stored to realize most suitable positioning procedures, for instance, according to operator's know how techniques concerning positioning operations, and to perform automatic positioning decision with high accuracy, and an automatic positioning operation is carried out according to the methods thus stored, whereby it is achieved accurately at all times.

The invention relates further to an machining unit application control apparatus which operates for determination of a machining operation completion in an electric discharge machine in which a machining electrode is moved in a direction in which the electrode is pushed into a workpiece, and in directions perpendicular to the aforementioned direction.

BACKGROUND ART

An electric discharge machine will be described which is one of the aforementioned variety of machining units.

FIG. 1 is an explanatory diagram showing the arrangement of an application control apparatus for an electric discharge machine which has been disclosed by Japanese Patent Application Publication No. 10769/1987 for instance. In FIG. 1, reference numeral 1 designates a machining electrode; 2, a workpiece to be machined; 3, a machining vessel; 4, a machining solution; 5, a spindle; 6, a drive motor; 7, a speed or position detector; 20, a machining unit; 21, an electrode position control section; 22, a machining power source; 23, a state recognizing section; and 31, an application control section. In this description, the term "machining unit" is intended to mean that which includes the above-described parts 1 through 7, and 21 and 22.

The operation of the application control apparatus thus constructed will be described. First, the operator determines initial machining conditions taking into account the material and size of a workpiece to be machined, machining quantity, finish accuracy, and so forth, and sets them for the machining unit 20. For instance, the operator sets the peak, pulse width and pulse interval of a pulse current, an electrode pull-up period, an electrode pull-up distance, electrode servo parameters, etc.

After the initial machining conditions have been set, a discharge machining operation is started. That is, the machining power source 22 applies the pulse voltage across the inter-electrode space (or discharge gap) between the machining electrode 1 and the workpiece 2 to induce electric discharges, whereby the workpiece 2 is machined with the electrode 1 which is moved relative to the workpiece 2. The electrode position control section 21 compares an average inter-electrode voltage provided by the state recognizing section 23 with a reference voltage, to control the position or speed of the machining electrode 1 thereby to maintain a suitable distance between the machining electrode 1 and the workpiece 2.

In an electric discharge machining operation, the distance between the machining electrode 1 and the workpiece 2 (hereinafter referred to as "an inter-electrode space or discharge gap", when applicable) is generally small, ten microns to several tens of microns. Therefore, in the case where the machining area is large, it is relatively difficult for the waste material such as sludge formed during discharge machining to flow through the inter-electrode space. As a result, an abnormal electric discharge is liable to occur. That is, the waste material stays in the inter-electrode space, so that electric discharges are inducted collectively at the position of the waster material. This difficulty attributes to the fact that, during electric discharge machining, waste material such as sludge is formed more than removed. The difficulty may be eliminated by the following method: The abnormal condition is detected or predicted, to suppress the production of waste material, or to accelerate the removal of waste material.

FIG. 2 shows the variations in position of the machining electrode 1. More specifically, the part (a) of FIG. 2 shows the variation in position of the machining electrode in the case where a normal electric discharge machining operation is carried out; whereas the part (b) of FIG. 2 shows the variation in position of the machining electrode in the case where the abnormal condition occurs in the inter-electrode space. During electric discharge machining, the machining electrode 1 is vibrated with an amplitude of 10 to 100 microns. In a normal electric discharge machining operation, the point 101 where the downward movement of the machining electrode is changed to the upward movement (hereinafter referred to "a minimum point 101", when applicable) is moved downwardly gradually as the discharge machining operation advances; whereas when the abnormal condition occurs in the inter-electrode space, the minimum point 101 is moved upwardly. Therefore, upon detection of the upward movement of the minimum point 101, by decreasing the pulse width of the pulse current supplied by the machining power source 22, the formation of waste material such as sludge in the inter-electrode space can be suppressed;

and by increasing the periodic electrode pull-up distance, the removal of waste material from the inter-electrode space can be accelerated.

In FIG. 1, the state recognizing section 23 detects the minimum point 101 from the variation in position of the machining electrode 1, and informs the application control section 31 of the upward or downward movement of the minimum point 101. When the upward movement of the minimum point 101 exceeds a predetermined threshold value, the application control section 31 determines that the abnormal condition has occurred in the inter-electrode space, and applies an instructions to the electrode position control section 21 to increase the electrode pull-up distance to accelerate the removal of the waste material or to the mechining power source 22 to decrease the pulse width of the pulse current to suppress the formation of waste material.

FIG. 3 is a circuit diagram of the application control section. The application control section applies an instruction 111 to the electrode position control section 21 to increase the electrode pull-up distance when the level of the minimum point 110 detected by the state recognizing section 23 exceeds a predetermined threshold value.

Another example of the conventional machining unit application control apparatus will be described.

FIG. 4 is a block diagram showing the conventional machining unit application control apparatus which has been disclosed by Japanese Patent Application (OPI) No. 297017/1986 (the term "OPI" as used herein means an "unexamined published application") for instance. In FIG. 4, reference numeral 51 designates a discharge machining process including an electric discharge phenomenon; 52, the amount of state of the discharge machining process; 53, an electrode control system; 54, an inter-electrode distance between a machining electrode and a workpiece which is controlled by the electrode control system; 55, a state detector for detecting the amount of state; 56, a detection value provided by the state detector 55; 57, an instruction value setting unit for setting the state of the discharge machining process; 58, an instruction value provided by the instruction value setting unit 57; 59, a difference value obtained from the instruction value 58 and the detection value; 60, a jump controlling unit for controlling a jumping operation; 61, an amount of jump operation; 62, a switching unit fort selecting an inter-electrode distance control according to the difference value 59 or a jumping operation according to the amount of jump; 63, an amount of operation which the switching unit 62 applies to the electrode control system 53; 64, a machining electrode position signal; 65, a jump setting unit for setting an amount of jump or a period of jump according to a machining depth in advance in order to perform a suitable jumping operation; and 66, a jump instruction value which the jump setting unit 65 applies to the jump controlling unit according to the machining electrode position signal 64.

In FIG. 1 the mechanical part of the machining unit is represented by the parts (1) through (7), whereas in FIG. 4 it is represented as objects to be controlled which are an inter-electrode distance inputted and an amount of machining state outputted.

An inter-electrode distance control operation will be described with reference to FIG. 4. In FIG. 4, the difference value 59 is obtained from the instruction value 58 provided by the instruction value setting unit 57 which sets a desirable state for the discharge machining process and the detection value 56 provided by the state detecting unit 55 which detects the state of the discharge machining process. The difference value 59 thus obtained is applied through the switching unit 62, as the amount of operation 63, to the electrode control system 53. The electrode control system 53 operates to adjust the inter-electrode distance 54 so that the difference value 59 be zeroed. Thus, desirable discharge machining conditions are maintained at all times.

However, as the discharge machining operation advances, the waste material formed is caused to stay in the inter-electrode gap between the machining electrode and the workpiece, as a result of which short-circuit occurs in the inter-electrode gap frequently. Hence, it is difficult to maintain the electric discharge machining operation stable merely by the above-described inter-electrode distance control.

Therefore, in general, a pumping action attributing to the jumping operation of the machining electrode is utilized to remove the waste material from the inter-electrode gap between the machining electrode and the workpiece.

The term "jumping operation" as used herein is intended to mean the periodic operation that, during inter-electrode gap control, the machining electrode is forcibly pulled up a predetermined distance from its machining position irrespective of the instruction value 58 or the detection value 56 and is then returned to the original machining position.

The jumping operation of the machining electrode is controlled as follows: Jumping conditions such as an amount of jump which is an electrode pull-up distance determined according to a machining depth and a period of jump which is an electrode pull-up period are set for the jump setting unit 65 in advance. A machining depth is obtained from the position signal 64 of the machining electrode which is in operation, and the jump instruction value 66 is transmitted to the jump controlling unit 60 referring to the jumping conditions set in the jump setting unit 65, as a result of which the jump controlling unit 60 applies the amount of jump operation 61 through the switching unit 62, as the amount of operation 63, to the electrode control system 53.

As is apparent from the above description, the machining electrode jumping operation is essential for maintaining the electric discharge machining operation stable at all times; however, in view of machining efficiency, it can be said that the jumping operation does not contribute directly to the machining of the workpiece. Thus, in order to improve the machining efficiency, it is essential to perform the jumping operation of the machining electrode most suitably.

In order to realize the most suitable jumping operation of the machining electrode, it is necessary to determine the jumping conditions such as an amount of jump and a period of jump not only from a machining depth but also a machining electric power source's pulse conditions, a machining electrode configuration, the materials of a machining electrode and a workpiece, and so forth. Thus, in general, the jumping operation is carried out by a person skilled in the art. That is, such a skilled person monitors a discharge machining operation, to change the jumping operation suitably according to the degree of instability of the discharge machining operation.

The conventional machining unit application control apparatus is constructed as described above. Therefore, the change of the electrode pull-up distance is determined merely from the result which is provided according to the method in which the electrode pull-up distance is increased when the amount of rise of the minimum point exceeds a predetermined threshold value. Therefore, it is difficult to realize the jumping control according to an intricate method such as a method expressed vaguely by the skilled person. This is a first problem accompanying the conventional machining unit application control apparatus.

The conventional machining unit application control apparatus is organized as described above. Therefore, in order to add another method of controlling an electrode pull-up distance or to change the method, it is necessary to change the hardware realizing the method. And in the case where the method is realized by software, the software for determining the electrode pull-up distance according to the method must be modified in its entirety. It is impossible to readily add or change the know how possessed by the manufacturer or user. Furthermore, in order to allow a plurality of machining units to hold a variety of know how in common, it is necessary to allow them to have in common not only the method but also hardware or software for realizing the method. Satisfying this requirement takes time and labor. This is a second problem accompanying the conventional machining unit application control apparatus.

The conventional machining unit application control apparatus thus constructed suffers from the following difficulties: In setting jumping conditions according to the method provided by the person skilled in the art to perform a most suitable jumping operation, it is difficult to suitably express as jumping conditions the qualitative and value expression included in the method. In order to automatically change the jumping operation according to the degree of instability of the discharge machining operation (without the skilled person) it is difficult to correctly describe the standard of decision on which the skilled person determines the degree of instability. Thus, it is rather difficult to improve the discharge machining efficiency. This is a third problem accompanying the conventional application control apparatus.

In the conventional application control unit thus organized, it is difficult to modify an operator's machining method. In addition, in collecting an operator's machining method, it is necessary to reveal the machining conditions for which the operator starts operations and the operations done by him. This is a fourth problem accompanying the conventional apparatus.

FIG. 5 is an explanatory diagram showing the arrangement of another example of the conventional electric discharge machine. In FIG. 5, reference numeral 1 designates a machining electrode; 2, a workpiece to be machined; 3, a machining vessel; 4, a machining solution; 5, a Z-axis; 6, a drive motor; 7, a speed and position detector; 8 and 9, an X-axis and a Y-axis, respectively; 10 and 11, an X-axis drive motor, and a Y-axis drive motor, respectively; 12 and 13, speed and position detectors for the X-axis drive motor and Y-axis drive motor, respectively; 21, an electrode position control section; 22, a machining electric power source; 23, a detection value processing section corresponding to the state recognizing section in FIG. 1; 31, an application control section comprising a numerical control unit (hereinafter referred to merely as "an NC unit", when applicable); 32, a CRT and a keyboard; 32, an I/O unit such as a paper tape reader.

The operation of the machine thus organized will be described. An automatic positioning operation is carried out as follows: The NC unit 31 applies an instruction to the machining electric power source unit 22 so that the latter outputs a DC low voltage different from that which is used for discharge machining; and the NC unit applies an instruction to the electrode position control section 21 so that the latter 21 operates to move the electrode in a specified direction along a specified axis. When the contact of the electrode with the workpiece 2 is detected by the detection value processing section 23, the NC unit 31 suspends the application of the instructions to the machining electric power source unit 22 and the electrode position control section 21. Thus, the automatic positioning operation has been accomplished.

The automatic positioning function is one of the fundamental functions of the NC unit 31. The operator determines the relative position of the electrode 1 and the workpiece 2, or measures the displacement of the electrode from the center by using the automatic positioning function in combination. The determination of the relative position of the electrode and the workpiece and the measurement of the displacement of the electrode from the center is carried out according to a positioning procedure which is considered best through the past experience of the operation, because the positioning procedure cannot be determined univocally depending on the configurations and reference values of the electrode and the workpiece. Furthermore, whether or not the result of the automatic positioning operation carried out by the NC unit 31 is acceptable is determined according to the past experience of the operator, the average value of the results of a plurality of automatic positioning operations, the deepest value in a plurality of automatic positioning operations, and the same value obtained continuously in several automatic positioning operations.

In the case where the electrode 1 and the workpiece 2 are equal in configuration and in reference surface, the positioning procedure is, in general, programmed by NC program for execution. On the other hand, it cannot be determined by the operator whether or not the result of the automatic positioning operation is acceptable; that is, the determination is carried out by utilizing the automatic positioning function of the NC unit. Therefore, if, in the automatic operation, the reference surface is smudged by some external disturbance during positioning or measuring, it is impossible to obtain the result of the positioning or measuring operation with high accuracy. In the positioning procedure, the automatic positioning feed speed and frequency belong to the know how of the operator.

The conventional automatic positioning control apparatus thus constructed suffers from the following difficulties: The operator must specify the positioning procedure for the NC unit, and he cannot be determine whether or not the result of the automatic position operation is acceptable; that is, the determination is carried out by utilizing the automatic positioning function of the NC unit. The operator's know how of the electrode positioning and measuring method is not reflected onto the automatic operation. This is a fifth problem accompanying the conventional apparatus.

Heretofore, in an electric discharge machining operation, the electrode and the workpiece are moved relative to each other in such a manner that the former is pushed into the latter, and the distance between the electrode and the workpiece in that direction is maintained constant by servo technique. Furthermore, in order to perform both a rough machining operation and a finish machining operation with one electrode, the electrode or the workpiece are moved in a direction perpendicular to the ordinary direction of feed; i.e., swinging motion is given to the electrode or workpiece.

A control method for the movement in the direction in which the electrode is pushed into the workpiece has been disclosed by Japanese Patent Application Publication No's. 19371/1986, 19372/1986, 19373/1986, 19374/1986, and 58256/1986 for instance.

With respect to the swinging motion, the control method for the movement in the direction in which the electrode is pushed into the workpiece will be described. In a first example of the control method, the electrode is swung a predetermined number of times when it reaches a desired position in the direction in which the electrode is pushed into the workpiece (hereinafter referred to as "an electrode pushing direction", when applicable), and then it is moved in the electrode pushing direction. In a second example of the control method, after the lapse of a predetermined period of time from the time instant that the electrode reaches the above-described desired position is detected with the difference between the discharge machining voltage and the reference voltage in a predetermined range, the electrode is moved in the electrode pushing direction. In a third example of the control method, after the lapse of a predetermined period of time from the time instant that the electrode reaches the above-described desired position is detected with the distance for which the electrode is moved back and forth by inter-electrode voltage serve being in a predetermined range.

In the above-described first, second and third control methods, the movement of the electrode is utilized for decision of the accomplishment of the machining operation; more specifically, it is used to determine whether or not, with the electrode reached the desired position, the workpiece has been machined uniformly to desired dimensions.

In the conventional discharge machining operation, the movement of the electrode in the direction in which the electrode is pushed into the workpiece is controlled as described above. Therefore, even when machining circumferences or machining environments are changed by variations of various factors such as the area and configuration of an electrode, machining depth, the configuration of revolution, machining conditions, the presence or absence of a jet stream of machining solution, the decision of the accomplishment of the machining operation is carried out in the same manner, as a result of which the machining accuracy is not uniform. For instance in the case where the jet stream of machining solution is used, the waster material such as sludge formed during machining is removed with high efficiency, and therefore the distance between the electrode and the workpiece may be relatively small. On the other hand, in the case where the jet stream of machining solution is not utilized, the ability of removing the waste material from the inter-electrode gap is low, and secondary electric discharge occurs through the waste material, thus increasing the inter-electrode gap between the electrode and the workpiece. Hence, if, when a plurality of workpieces are machined the same depth, for all the workpieces thus machined the accomplishment of the machining operation is decided in the same manner, then the workpiece machined without the jet stream of machining solution is relatively large in dimension; whereas the workpiece machined with the jet stream of machining solution is relatively small in dimension. This is a sixth problem accompanying the conventional apparatus.

DISCLOSURE OF THE INVENTION

A first object of this invention is to solve the above-described first problem. More specifically, the first object is to provide a machining unit application control apparatus with which an amount of operation can be determined according to a plurality of methods, and the methods can be readily added and modified, whereby machining know how techniques of operators can be utilized for automatic machining operations for instance.

A second object of the invention is to solve the above-described second problem. More specifically, the second object is to provide a machining unit application control apparatus with which automatic machining operations or the like can be achieved according to intricate methods such as those on machining know how techniques of operators, and the methods can be readily added and modified and can be used by a plurality of machining unit in common.

A third object of the invention is to solve the above-described third problem. More specifically, the third object is to provide a machining unit application control apparatus with which methods of skilled operators concerning jumping conditions effective in performing a jumping operation most suitably and a reference for determination of a degree of instability in a discharge machining operation can be written with ease, and the methods are effectively used for automatically performing or changing a jumping operation with high accuracy.

A fourth object of the invention is to solve the above-described fourth problem. More specifically, the fourth object is to provide a machining unit application control apparatus with which an automatic machining operation can be performed according to machining methods of operators, and the machining methods can be collected and corrected with ease.

A machining unit application control apparatus, according to a first aspect of the invention, comprises: a knowledge memory section in which a plurality of methods of changing machining states are written; a status memory section in which present and/or past machining states and/or machining conditions are stored; and an inference section for combining a plurality of results provided according to the machining states and/or machining conditions stored in the status memory section and the method concerning the statuses which are stored in the knowledge memory section, to obtain machining conditions for better machining states.

A machining unit application control apparatus according to a second aspect of the invention comprises: a knowledge memory section in which a plurality of methods of changing machining states are written according to a rule consisting of a front condition part describing a condition to be determined and a rear condition part describing contents to be carried out when the condition is satisfied or not satisfied; a status memory section in which present and/or past machining states and/or machining conditions are stored; and an inference section for inferring machining conditions for better machining states from statuses stored in the status memory section and the methods stored in the knowledge memory section, In an electric discharge machining control apparatus according to a third aspect of the invention, methods effective in performing the jumping operation of the machining electrode are stored, present or past machining statuses required for the methods are detected by a status detecting unit, the detection values are stored in a status memory section, an inference section operates to combines the results provided according to the methods stored in the knowledge memory section and the statuses stored in the status memory section, whereby instructions for performing a most suitable jumping operation or appropriately changing it are applied to a jump controlling unit.

A machining unit application control apparatus according to a fourth aspect of the invention includes a first arrangement group which comprises: a knowledge memory section in which methods of changing machining conditions are written; a state recognizing section for detecting machining states and processing signals; a status memory section in which machining states provided by the state recognizing section and/or set machining conditions are stored; and an inference section for obtaining machining conditions for better machining states according to the machining states and/or machining conditions stored in the status memory section and the methods concerning the statuses which are stored in the knowlege section; and a second arrangement group which comprises: time-series data recording section for recording time-series data including the set machining conditions, the machining states provided by the state recognizing section and machining condition changing operations performed by an operator; and a knowledge renewing section for extracting a machining method from the contents of the time-series data recording section, to renewing or correcting the methods stored in the knowledge memory section.

In the machining unit application control apparatus according to the first aspect of the invention, the inference section operates to combines the operating data provided according to a plurality of methods such as methods which are described vaguely by skilled operators, to suitably perform a machining operation according to intricate machining know how techniques, and the methods are stored in the knowledge memory section independently of the inference section whereby the methods can be added or modified with ease.

In the machining unit application control apparatus according to the second aspect of the invention, the methods of changing machining states are written in the knowledge memory section according to the predetermined rules and are made independent of the inference section, whereby machining know how techniques of skilled operators can be modified by a manufacture or user or can be used by a plurality of machining units in common; and the inference section can determine machining conditions for excellent machining states according to intricate machining know how techniques.

In the apparatus according to the third aspect of the invention, the methods including qualitative and vague expressions made by skilled operators which are effective in allowing the machining electrode to jump most suitably are appropriately and readily written in the knowledge memory section, so that the inference section collectively determines execution of a most suitable jumping operation and appropriate change of it according to the methods written in the knowledge memory section and the statuses which are detected by the status detecting unit with respect to the methods and stored in the status memory section.

In the apparatus according to the fourth aspect of the invention, normally the machining methods of skilled operators stored in the knowledge memory section of the first arrangement group are used for inference of machining conditions according to machining statuses so that the machining unit operates in desirable state, whereby the machining operation is carried out as performed by a skilled person.

When, in the apparatus according to the fourth aspect of the invention, machining methods of skilled operators are collected or corrected, the first and second arrangement groups are used. That is, the machining operation is carried out with part or all of the machining conditions modified by the operator without use of the output of the inference section. After the machining operation has been accomplished, the machining method used is extracted, and the machining methods stored in the knowledge memory section are modified suitably according to the machining method thus extracted. Thus, the machining methods of skilled persons stored in the knowledge memory section are improved, thus promising better control for the machining unit.

A fifth object of the invention is to solve the above-described fifth problem. More specifically, a fifth object of the invention is to provide an automatic positioning controlling device in which an automatic positioning speed and automatic positioning frequency are most suitably determined from a plurality of positioning procedures according to the configuration, reference surface, etc. of an machining electrode and workpiece, and the acceptability of the results of the automatic positioning operation can be checked under the same rules as those used by skilled persons.

The fifth object of the invention has been achieved by the provision of an automatic positioning control device for an electric discharge machine which, according to the invention, comprises: a memory section which stores a plurality of positioning procedures and a plurality of methods of determining whether or not the result of an automatic positioning operation is acceptable; and a logic section for determining an automatic positioning completion position and amounts of operations provided by the plurality of procedures. In the automatic positioning control device, the logic section operates to combine the amounts of operations provided by the plurality of procedures, thereby to realize an automatic positioning operation on intricate know how techniques. Furthermore, the results provided by the plurality of methods are combined, to determine the automatic positioning completion position with higher accuracy. In addition, the memory section stores the positioning procedures and the methods of determining whether or not the result of an automatic positioning operation is acceptable, independently of the logic section, with the result that the methods can be readily modified.

A sixth object of the invention is to solve the above-described sixth problem. More specifically, a sixth object of the invention is to provide a method of utilizing machining environmental conditions such as electrode configurations, machining solution jetting methods and machining depths to determine the completion of a machining operation with high accuracy, and to provide a machining operation completion determining apparatus for practicing the method.

In order to achieve the sixth object of the invention, an electric discharge machining operation completion determining method is provided for an electric discharge machining method in which an electrode and a workpiece are moved relative to each other in such a manner that the electrode is pushed into the workpiece, and a machining operation is carried out while the distance between the electrode and the workpiece in the direction of movement of the electrode being maintained constant by servo control, and while the electrode or workpiece being oscillated in directions perpendicular to the direction of movement of the electrode. In the method, according to the invention, machining environmental factors including machining solution jet pressure, machining area, machining depth and oscillation radius are detected and analyzed, to determine machining operation completion determining parameters including a range of difference between discharge machining voltage and reference voltage, and a duration time within the range of difference, and determination of the completion of a machining operation is carried out according to whether or not the machining operation completion determining parameters are satisfied by detection values provided during machining.

Furthermore, in order to achieve the sixth object of the invention, an electric discharge machining operation completion determining apparatus is provided for an electric discharge machine for practicing the above-described electric discharge machining method. The apparatus, according to the invention, comprises: a first memory section in which a plurality of methods concerning detection and analysis of machining environmental factors including machining solution jet pressure, machining area, machining depth and oscillation radius; a second memory section which stores present and/or past machining states and machining environmental conditions; and a logic section for combining a plurality of results provided according to the machining states and machining environmental conditions stored in the second memory section and the plurality of methods stored in the first memory section, to obtain a machining operation completion determining parameter, and to determine a machining operation completion according to the parameter.

In the electric discharge machining operation completion determining method thus organized, a plurality of machining environmental factors such as machining solution jet pressure, machining area, machining depth and oscillation radius are detected and analyzed to determine machining operation completion determining parameters according to the machining environmental factors. Hence, the completion of a machining operation can be accurately determined according to whether or not the machining operation completion determining parameters are satisfied by detection values provided during machining.

In the electric discharge machining operation completion determining apparatus for practicing the above-described method, the logic section operates to combine a plurality of results provided according to the present and/or machining states and machining environmental conditions stored in the second memory section and the plurality of methods concerning detection and analysis of the machining environmental factors stored in the first memory section, to obtain a machining operation completion determining parameter. Hence, even in an intricate machining mode, the completion of a machining operation can be determined with high accuracy.

BRIEF DESCRIPTION OF THE DRAWINGS

FIG. 7 is an explanatory diagram for a description of methods of controlling an electrode pull-up distance.

FIG. 9 is an explanatory diagram for a description of methods of controlling an electrode pull-up distance according to a rule.

FIG. 10 is an explanatory diagram for a description of methods of controlling an electrode pull-up distance according to a rule which is expressed according to the fuzzy set theory.

FIG. 11 is an explanatory diagram indicating fuzzy set with membership function.

FIG. 12 is an explanatory diagram for a description of electrode pull-up distance controlling methods according to rules.

FIG. 13 is a block diagram showing an electric discharge machining control apparatus, a third embodiment of the invention.

FIG. 14 is an explanatory diagram showing examples of a method of effectively permitting the jumping operation of a machining electrode.

FIGS. 18a–18c and 19a–19b are explanatory diagrams for a description of the operation of the apparatus shown in FIG. 17.

FIGS. 20 and 21 are flow charts for a description of the operation of the apparatus shown in FIG. 17.

FIGS. 25 through 30 are provided for another embodiment of the invention. More specifically, FIG. 25 is a diagram showing the arrangement of an electric discharge machine.

FIGS. 26a and 26b are graphical representations showing the contents of a first memory section including methods of determining an automatic positioning speed and an automatic positioning frequency.

FIG. 27 is a flow chart for a description of the operation of processing an automatic positioning speed and an automatic positioning frequency according to the contents of the first memory section.

FIG. 28 is an explanatory diagram showing data on an electrode and a workpiece which are written in a second memory section.

FIG. 29 is a graphical representation showing the contents of the first memory section including methods of determining whether or not an automatic positioning completion position is acceptable.

FIG. 30 is a flow chart for a description of a process of determining the completion of an automatic positioning operation or requiring the re-execution of the automatic positioning operation according to the degree of confidence on an automatic positioning operation completion position.

BEST MODE FOR CARRYING OUT THE INVENTION

A first embodiment of this invention will be described with reference to FIG. 6

Figure 6:
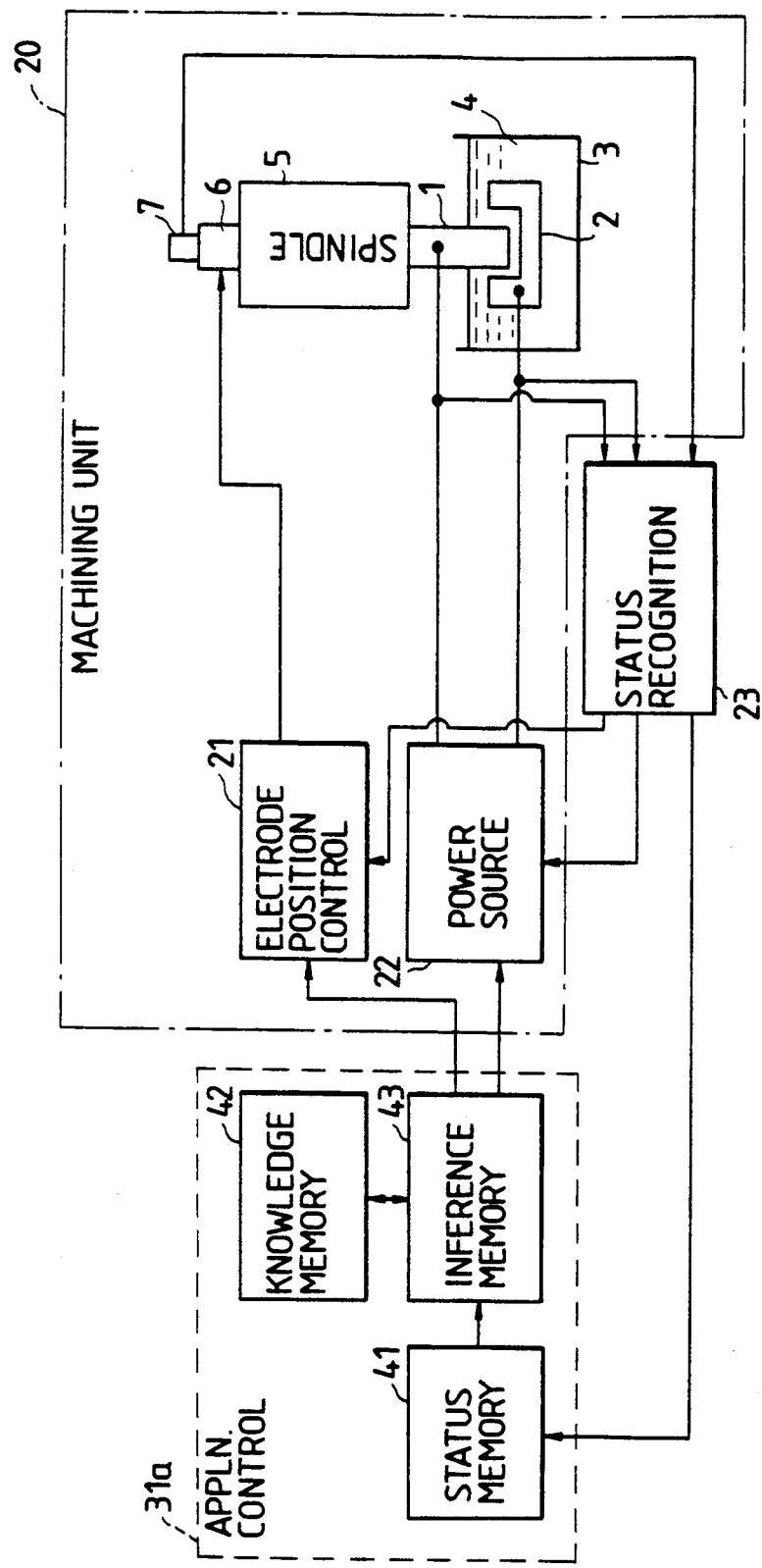
FIG. 6 is an explanatory diagram showing the arrangement of a machining unit application control apparatus, one embodiment of the invention.

In FIG. 6, reference numerals 1 through 23 designates the same items as those in FIGS. 1 through 5 showing the conventional apparatuses described before; 31a, an application control section; 41, a status memory section; 42, a knowledge memory section; and 43, an inference memory section.

The operation of the embodiment thus organized will be described. Several methods of determining an electrode pull-up distance as shown in FIG. 7 are stored in the knowledge memory section 7. In method 1, similarly as in the prior art, increase of the electrode pull-up distance is determined from the rise of the minimum point. Heretofore, the presence or absence of increase is determined merely by referring to the threshold value; whereas in the invention, the method is stored in the knowledge memory section 42 by means of software, and therefore the method stored therein can be more intricate. In method 2, the electrode pull-up distance is controlled according to the distribution density variation rate of the time of period (hereinafter referred to as "no-load time", when applicable) which elapses from the time instant that a pulse voltage is applied across the electrode and the workpiece until electric discharge starts. The methods may be stored in the knowledge memory section 42 by using hardware such as operational amplifiers and switches instead of software.

Figure 8:
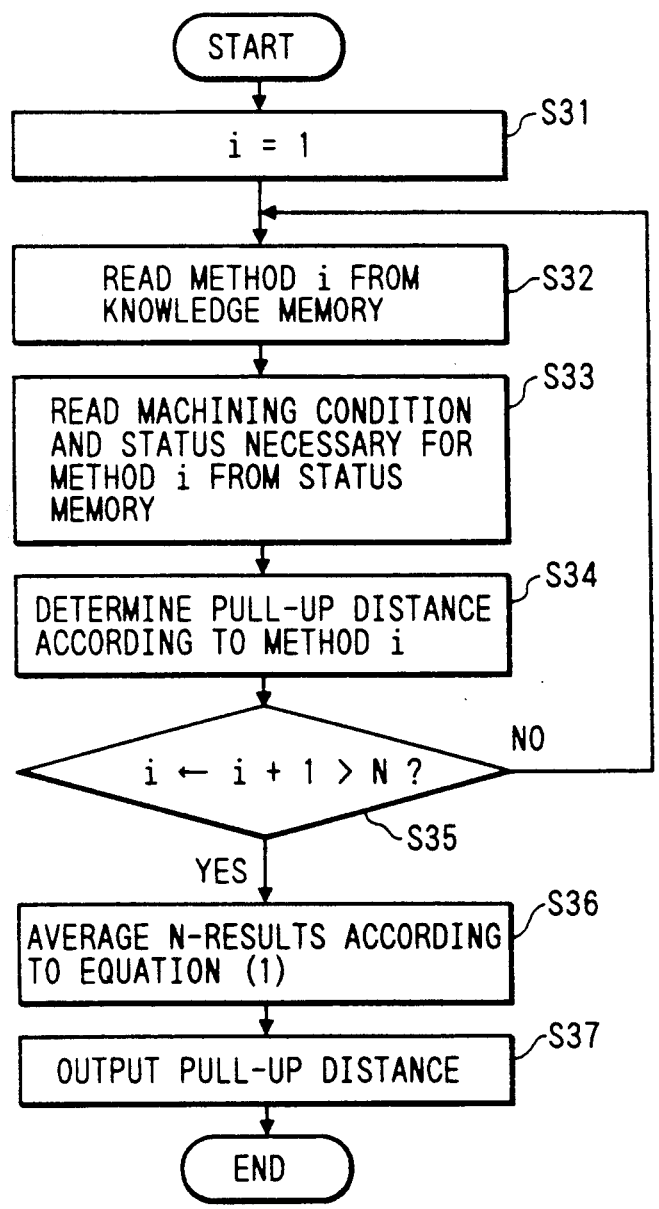
FIG. 8. is a flow chart for a description of a method of obtaining an electrode pull-up distance.

FIG. 8 is a flow chart showing a procedure of obtaining an increase or decrease of the electrode pull-up distance by using the methods stored in the knowledge memory section 42 and the machining statuses and machining conditions stored in the status memory section 41. First, the inference section 43 reads method 1 from the knowledge memory section 42, to obtain an increase or decrease $Z_1$ of the electrode pull-up distance in method 1 according to the degree of rise of the minimum point which has been stored in the status memory section 41 (Steps S31 through S34). Similarly, according to method 2, an increase or decrease $Z_2$ of the electrode pull-up distance in method 2 is obtained according to method 2 and the distribution density variation rate of the no-load time (Steps S35, and S32 through S34).

In the embodiment, N=2, and therefore the result of Step S35 is "YES". Two results obtained by the two methods are combined, to determine an increase or decrease $Z_t$ of the electrode pull-up distance, which is applied to the electrode position control section 21 and the machining electric power source 22 (Steps S35 through S37).

In this connection, the following equation (1) may be utilized to average the results obtained by the methods:

$$Z_t = \frac{1}{N} \sum_{K=1}^{N} Z_k \qquad (1)$$

where $N$ is the number of methods.

In the case of method 2, it is necessary to obtain the distribution density variation rate of the no-load time. It can be obtained as follows: In the detection value processing section 23, the no-load time is measured for a predetermined interval. By using the no-load time thus measured, a distribution density variation rate is calculated according to equation (5) shown in FIG. 7, and stored in the status memory section. In the case of method 1, it is necessary to obtain the degree of rise of the minimum point. In this case, it is obtained in the detection value processing section 23, and stored in the status memory section 41.

Thus, by obtaining a machining condition (increase or decrease of the electrode pull-up distance) through combination of a plurality of results, intricate application control can be realized according to a plurality of methods.

In the above-described embodiment, the two methods of determining an increase or decrease of the electrode pull-up distance by using the rise of the minimum point and the distribution density variation rate of the no-load time are stored in the knowledge memory section 42. However, it goes without saying that more intricate and delicate application control can be achieved by determining machining conditions according to a method in which the knowledge memory section 42 stores more than two methods of determining machining conditions such as the pulse width, pulse interval and peak of a pulse current and an electrode pull-up period by using sounds generated during machining, vibration of the machining electrode, formation of bubbles in the machining solution, etc.

In the above-described embodiment, the results provided by the inference section 43 are combined according to equation 1; however, it goes without saying that the combination may be achieved by various methods of using weighted mean, addition, maximum value, minimum value, etc.

In the above-described embodiment, the methods are stored in the knowledge memory section in a relatively free form as shown in FIG. 7. However, they may be stored in a form that "if . . . , then . . . ". For instance, method 2 stored in this form is as shown in FIG. 9. If method 1 is expressed in the form that "if . . . , then . . . ", then the following merits can be obtained: the storage is unified in form, and the method can be stored in the knowledge memory section with ease, and the processing operation of the inference section is simplified.

In the case of method 2a shown in FIG. 9, a quantitative value as in "if . . . is 0.8 or less" is indicated; however, the machining know how of the operator is often expressed using qualitative words such as "large" and "small". The method can be stored according to a rule using the fuzzy set theory which permits such qualitative expression. The methods shown in FIG. 9 may be stored according to the fuzzy set theory as shown in FIG. 10.

In this case, in order to employ qualitative words such as "large" and "small", membership functions as shown in FIG. 11 are used.

For instance, in method 2A in FIG. 10, the following sentence is provided: "if the distribution density variation rate of the no-load time is small". The fuzzy set for the word "small" of the sentence can be expressed by the membership function corresponding to "small" in FIG. 11, a diagram indicating the distribution density variation rate of the no-load time. For instance, if the variation rate is 0.7, the corresponding membership function is 1, and if the variation rate is 0.9, then the corresponding membership function is $\frac{1}{3}$. In this connection, the membership function "1" means that it belongs completely to the set, and the membership function "0" means that it does not belong to the set at all.

In the case where, as in FIG. 10, a method is stored according to a rule based on the fuzzy set theory, machining conditions are determined by fuzzy composition (or fuzzy inference). A variety of methods have been proposed for fuzzy composition. One of the methods is as follows:

It is assumed that a rule has been expressed as follows:
Rule i: if $x_i$ is $A_i$ and $y_i$ is $B_i$, then set u to $C_i$.
where $x_i$ and $y_i$ are the machining statuses or machining conditions such as the rise of the minimum point stored in the status memory section 41, u is the machining condition applied to the electrode position control section 21 or the machining electric power source 22, $A_i$, $B_i$ and $C_i$ are the fuzzy sets of "large", "small", etc., and the suffix letter "i" means the i-th rule.

If the membership functions for $A_i$, $B_i$ and $C_i$ are represented by $f_{Ai}$, $f_{Bi}$ and $f_{Ci}$, respectively, then the aimed machining condition $u_t$ can be obtained from the following equations (2) through (4):

$$\widetilde{f_{Ci}(u)} = f_{Ci}(u) * \{f_{Ai}(x_i) \wedge f_{Bi}(y_i)\} \quad (2)$$

$$f_C(u) = \widetilde{f_{Ci}(u)} \quad (3)$$

$$u_t = \{\int f_C(u) \, u \, du\} / \{\int f_C(u) \, bu\} \quad (4)$$

where $\wedge$ and $\vee$ are the operators having a minimum value and a maximum value, and * is the multiplication or α-cut operator.

The results based on the plurality of rules are calculated according to equation (2), and are combined according to equations (3) and (4) to obtain the machining condition $u_t$. Thus, intricate application control based on a plurality of methods can be realized with ease.

In the above-described embodiment, the machining unit is the electric discharge machine. However, it goes without saying that, for a laser beam machine, beam machine, electro-chemical machine, NC lather, NC grinding machine, etc. in which application control can be realized by adjusting machining conditions according to machining statuses, intricate application control can be readily realized by determining machining conditions with the results provided by the plurality of methods combined in the above-described manner. For instance, in a laser beam machine, an application control device for determining the output of a light source can be realized by combination of the results provided by a method of adjusting the output of a light source to prevent the wear at corners and by a method of adjusting the output of a light source according to the thickness of a plate.

As was described above, in the invention, the methods are stored in the knowledge memory section 42 independently of the inference section 43. Therefore, the methods can be readily modified merely adding or changing data in the knowledge memory section. A procedure of executing a method or a procedure of combining a plurality of methods is as indicated in FIG. 7 or the fuzzy inference (in the inference section 43) described with equations (2) through (4), which is unnecessary to change.

Let us consider the case where, for instance, a method of determining the electrode pull-up distance according to the vibration of the electrode is added as method 3. In the case of "independent storage", all that is necessary to additionally store the method in the knowledge memory section 42. On the other hand, in the case of "dependent storage", it is necessary to change the contents of the knowledge memory section including the program in the application control section 31 with the execution of the method, combination of the method with other methods, and determination of the electrode pull-up distance taken into account.

Now, a second embodiment of the invention will be described with the accompanying drawings.

Figure 1:
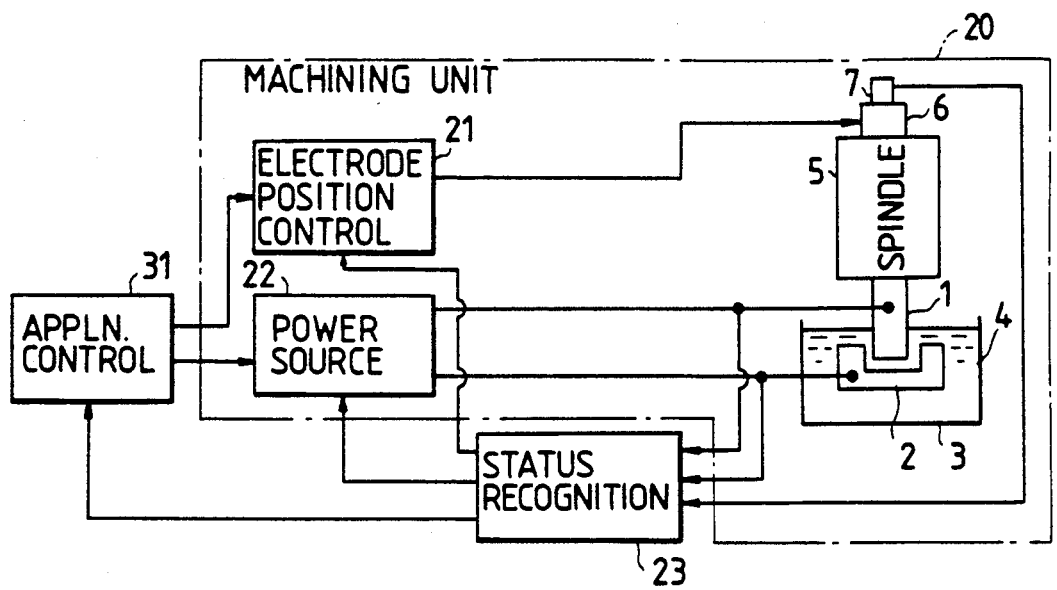
FIG. 1 is an explanatory diagram showing the arrangement of one example of a conventional machining unit application control apparatus.

In the second embodiment, a method of determining a change of the electrode pull-up distance as shown in FIG. 1 is stored in the knowledge memory section 42. In the cases of rules 1a, 1b and 1c, an increase of the electrode pull-up distance is determined according to the rise of the minimum point similarly as in the prior art. In the prior art, the increase or decrease is determined by using the threshold value. On the other hand, in the invention, the method is stored in the knowledge memory section 42 by means of software independently of the inference section 43, and therefore an intricate method can be stored therein. Rules 2a, 2b and 2c indicate a method of controlling (increasing or decreasing) the electrode pull-up distance according to the distribution density variation rate of the period of time which elapses from the time instant that a pulse voltage is applied across the discharge gap between the electrode and the workpiece until electric discharge takes place (hereinafter referred to as "no-load time", when applicable). The method can be stored in the knowledge memory section 42 by using hardware such as operational amplifiers and switches instead of software.

The storage will be described with reference to the flow chart of FIG. 8. First, the inference section 43 reads rules 1a through 1c from the knowledge memory section 42, to obtain an increase or decrease $Z_1$ of the electrode pull-up distance according to rules 1a through 1c in response to the degree of rise of the minimum point stored in the status memory section (Steps S31 through S34). Similarly, an increase or decrease $Z_2$ of the electrode pull-up distance is obtained according to rules 2a through 2c and the distribution density variation rate of the no-load time (Steps S35, and S32 through S34). Next, by combining the results provided by the method, an increase or decrease $Z_t$ is determined, and it is applied to the electrode position control section 21 and the machining electric power source 22 (Steps S36 and S37). Similarly as in the above-described equation (1), the results may be averaged.

In the employment of rules 2a through 2b, it is necessary to obtain the distribution density variation rate of the no-load time. It can be obtained as follows: In the detection value processing section 23, the no-load time is measured for a predetermined interval. By using the no-load time thus measured, a distribution density variation rate is calculated according to equation (5) shown in FIG. 7, and stored in the status memory section 41. In the case of rules 1a through 1c, it is necessary to obtain the degree of rise of the minimum point. In this case, it is obtained in the detection value processing section 23, and stored in the status memory section 41.

Thus, by obtaining a machining condition (increase or decrease of the electrode pull-up distance) through combination of a plurality of results, intricate application control can be realized according to a plurality of methods.

In the above-described second embodiment, the method of determining an increase or decrease of the electrode pull-up distance by using the rise of the minimum point and the distribution density variation rate of the no-load time is stored in the knowledge memory section 42. However, it goes without saying that more intricate and delicate application control can be achieved by determining machining conditions according to a method in which the knowledge memory section 42 stores a method of determining machining conditions such as the pulse width, pulse interval and peak of a pulse current and an electrode pull-up period by using sounds generated during machining, vibration of the machining electrode, formation of bubbles in the machining solution, etc.

In the above-described second embodiment, the results provided by the inference section 43 are combined according to equation 1; however, it goes without saying that the combination may be achieved by various methods of using weighted mean, addition, maximum value, minimum value, etc.

Furthermore, communication means or the like may be used to allow part or all of the data of the rules stored in the knowledge memory section 42 to be used by the machining unit application control apparatus and others machining unit application control apparatuses in common. Hence, in a factory or the like having a plurality of machining units which are similar in function, common machining know-how techniques can be collectively controlled, and the machining know how peculiar to each machining unit can be controlled by its own machining unit application control apparatus.

Furthermore, if part or all of the data of the rules stored in the knowledge memory section 42 are transferred into a magnetic disk so that they are returned to the section when necessary, then, with one and the same machining unit, machining operations based on different machining know how techniques can be realized with ease. The same effects can be obtained by using an optical disk, IC cartridge, magnetic bubble memory, magnetic tape, or the like instead of the magnetic disk.

In the above-described second embodiment, the machining unit is the electric discharge machine. However, it goes without saying that, for a laser beam machine, beam machine, electrochemical machine, NC lather, NC grinding machine, etc. in which application control can be realized by adjusting machining conditions according to machining status, intricate application control can be readily realized according to a method in which the machining know how techniques of the operator are stored according to the rules, and the results thereof are combined to determine machining conditions. For instance, in a laser beam machine, an application control device for determining the output of a light source can be realized by combination of the results provided by a method of adjusting the output of a light source to prevent the wear at corners and by a method of adjusting the output of a light source according to the thickness of a plate.

The rule shown in FIG. 7 is made up of rules 1a through 1c and rules 2a through 2c; however, an application control apparatus may be realized, for instance, by writing one rule which is a consolidation of rules 1a through 1b.

Figure 2A:
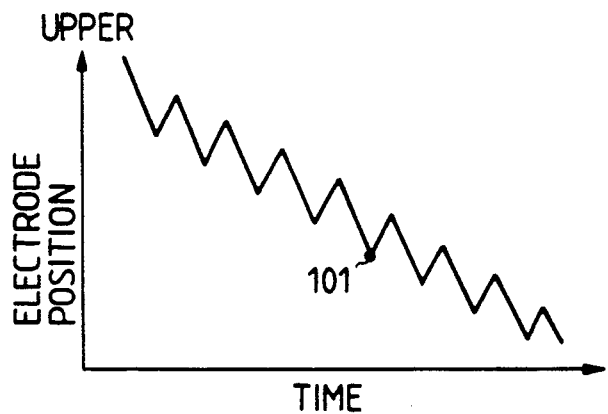
FIGS. 2a and 2b are explanatory diagrams for a description of the movements of a machining electrode.
Figure 2B:
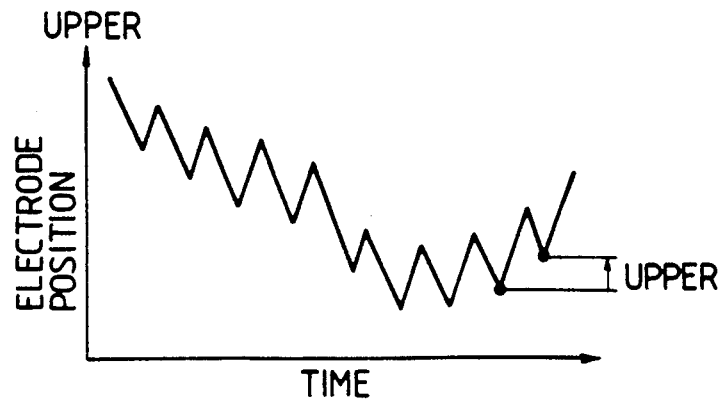
Figure 3:
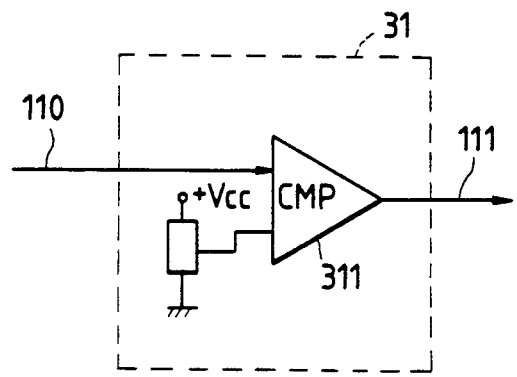
FIG. 3 is a circuit diagram showing an application control section.

In the above-described second embodiment, data are written in the form of rules in the knowledge memory section 42; that is, the writing form is unified, and therefore it is possible to rewrite essential parts only in such a manner that only a front condition part or rear condition part is written. Therefore, in this case, addition and modification of the methods can be achieved more readily than in the case of FIG. 7. In the case of FIG. 2, modification of the method will require much time because it is necessary to understand all the sentence of the method.

Now, a third embodiment of the invention will be described with reference to FIG. 13.

In FIG. 13, reference numerals 51 through 63 designates the same items as those in the figures showing the prior art. Further in FIG. 13, reference character 42a designates a knowledge memory section; 68, a method read out of the knowledge memory section 42a; 69, machining status data required at least for the method stored in the knowledge memory section 42a; 70 a status detecting unit for detecting the machining status data; 71, a detection value provided by the status detecting unit 70; 72, a status memory section for storing at least one of the current and past detection values 71; 73, status data necessary for the above-described method 68 read out of the status memory section 41a; 43a, an inference section for collectively determining a most suitable jumping operation and most applicable change according to the method 68 stored in the knowledge memory section 42a and the status data 73 stored in the status memory section 41a; and 75, an instruction value applied to a jump controlling unit 60 by the inference section 43a.

Figure 4:
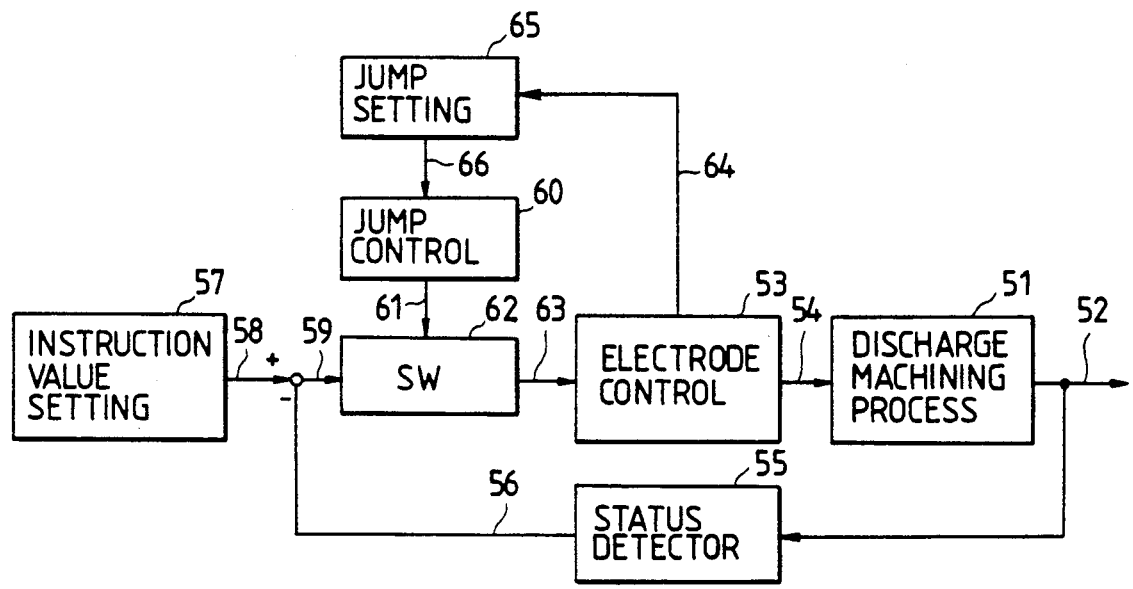
FIG. 4 is a block diagram showing another example of the conventional machining unit application control apparatus.
Figure 5:
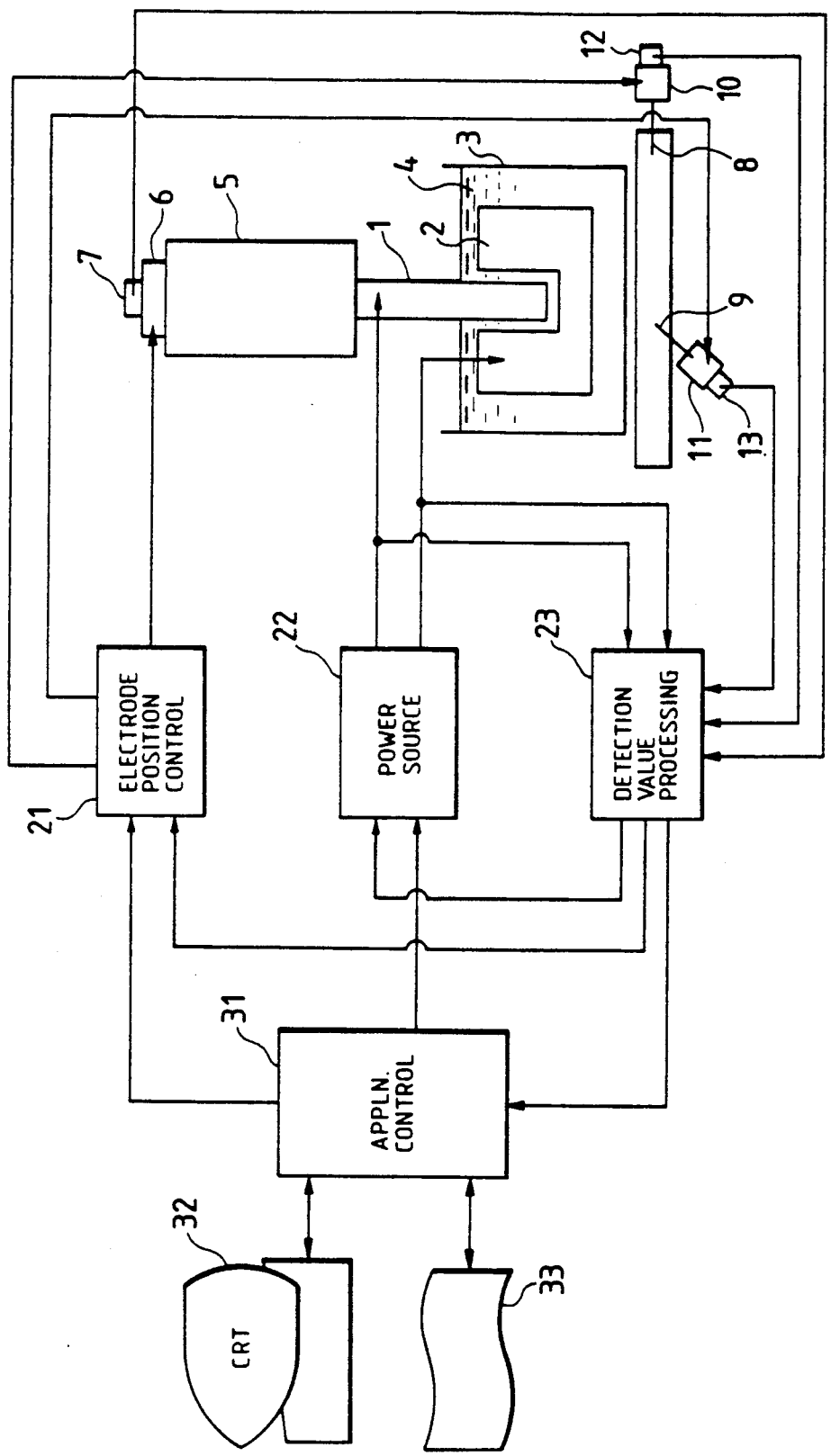
FIG. 5 is an explanatory diagram showing one example of a conventional electric discharge machine.

Similarly as in the case of FIGS. 1 and 4, in FIG. 6 the mechanical part of the machining unit is represented by the mechanical elements 1 through 7, while in FIG. 13 an input, inter-electrode distance, and an output, machining state data are expressed as objects to be controlled. Hence, it is rather difficult to directly compare FIGS. 6 and 13 with each other. However, the following components correspond relatively one another in FIGS. 6 and 13:

The electrode position control section 21 in FIG. 6 corresponds to the combination of the electrode control system 53, the jump controlling unit 60 and the switching unit 62 in FIG. 13.

The state recognizing section 23 corresponds to the combination of the state detecting unit 55 and the status detecting unit 70.

The status memory section 41 corresponds to the combination of the status memory section 41a and the instruction value setting unit 57.

The knowledge memory section 42 corresponds to the knowledge memory section 42a.

The inference section 43 corresponds to the knowledge section 43a.

Figure 15:
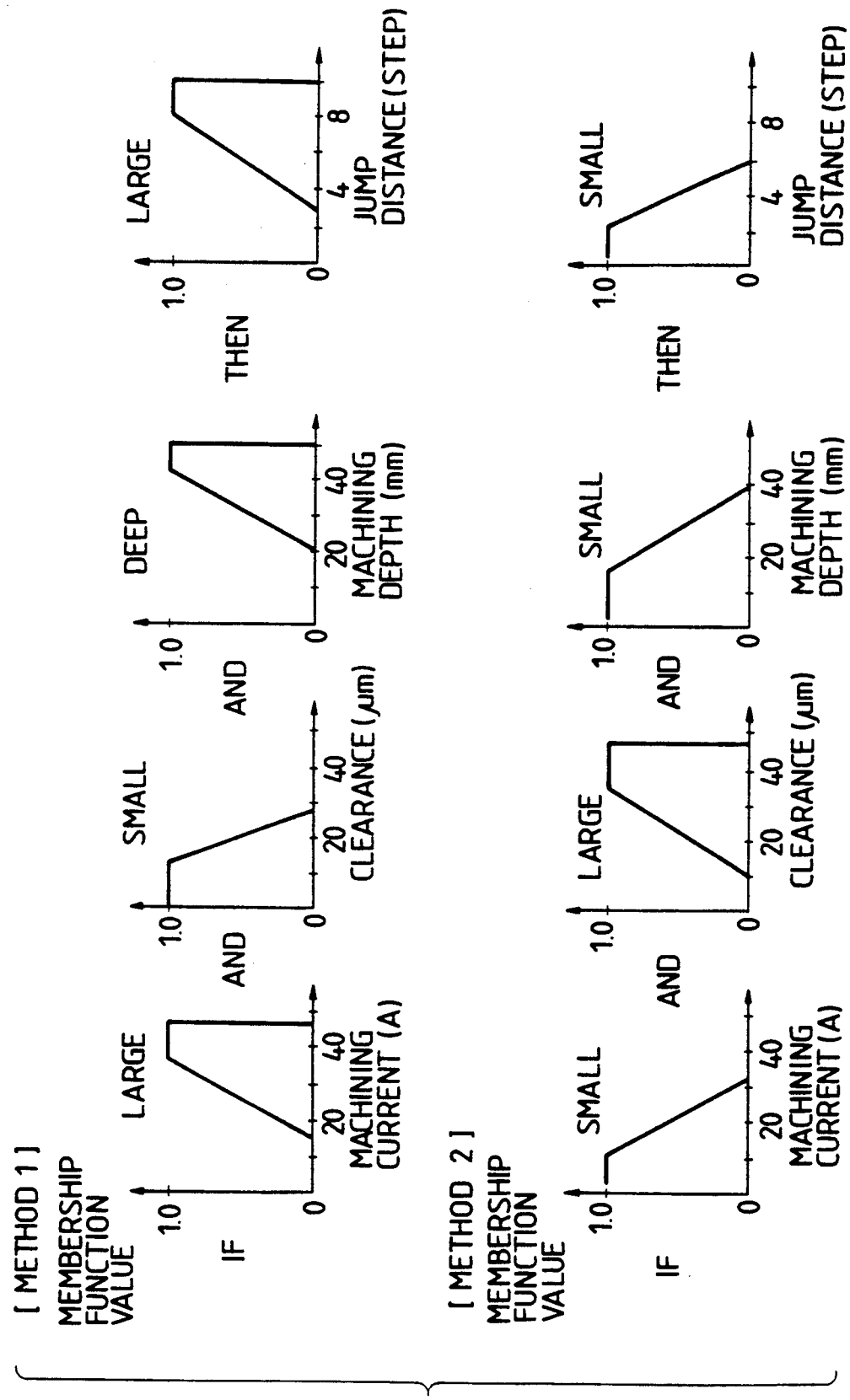
FIG. 15 is an explanatory diagram showing the methods of FIG. 14 which are expressed according to the fuzzy set theory.

A method of forming the instruction value 75 most suitable for the jumping operation of the machine in the embodiment shown in FIG. 13 will be described. FIG. 14 is an explanatory diagram showing one example of a method of effectively causing the machining electrode to jump. It is impossible for a conventional electric discharge machining control device to write such a method effectively and readily. In the invention, a fuzzy set as shown in FIG. 15 is utilized to write methods as shown in FIG. 14 in the knowledge memory section 42a according to a rule consisting of a front condition part "IF" and a rear condition part "THEN". More specifically, qualitative fuzzy expressions "machining current is large", "clearance is small", "machining depth is large", "jumping distance is short", etc. included in the methods of FIG. 14 are expressed as membership functions. For instance, in the case of a feature "machining current is large" in method 1 of FIG. 14, if the machining current is 15 A or less, the feature does not meet the condition, and therefore the membership function is set to zero; if the machining current is 35 A or higher, then the feature meets the condition completely, and the membership function is set to "1"; and if the machining current is between 15 A and 35 A, then the feature meets the condition between "0" and "1", and the membership function is set to "0-1". Similarly, the other qualitative fuzzy expressions can be appropriately and readily written with membership functions.

On the other hand, with the aid of the state detecting unit 70, the status memory section 41a detects and stores machining statuses necessary for the methods stored in the knowledge memory section 42a. Furthermore, the status memory section 41a receives and stores known data such as machining current.

In the case of FIG. 14, necessary machining statuses are machining current, clearance and machining depth. The machining current is a known value because the operator can set it as one of the machining conditions.

The clearance is determined mainly from an inter-electrode servo voltage (an instruction value from the machining gap control system), an inter-electrode voltage and a set machining current, and is known as machining condition data.

The machining depth is provided, as the positional difference between a machining start position and a current position, by the electrode position detecting unit.

Figure 16:
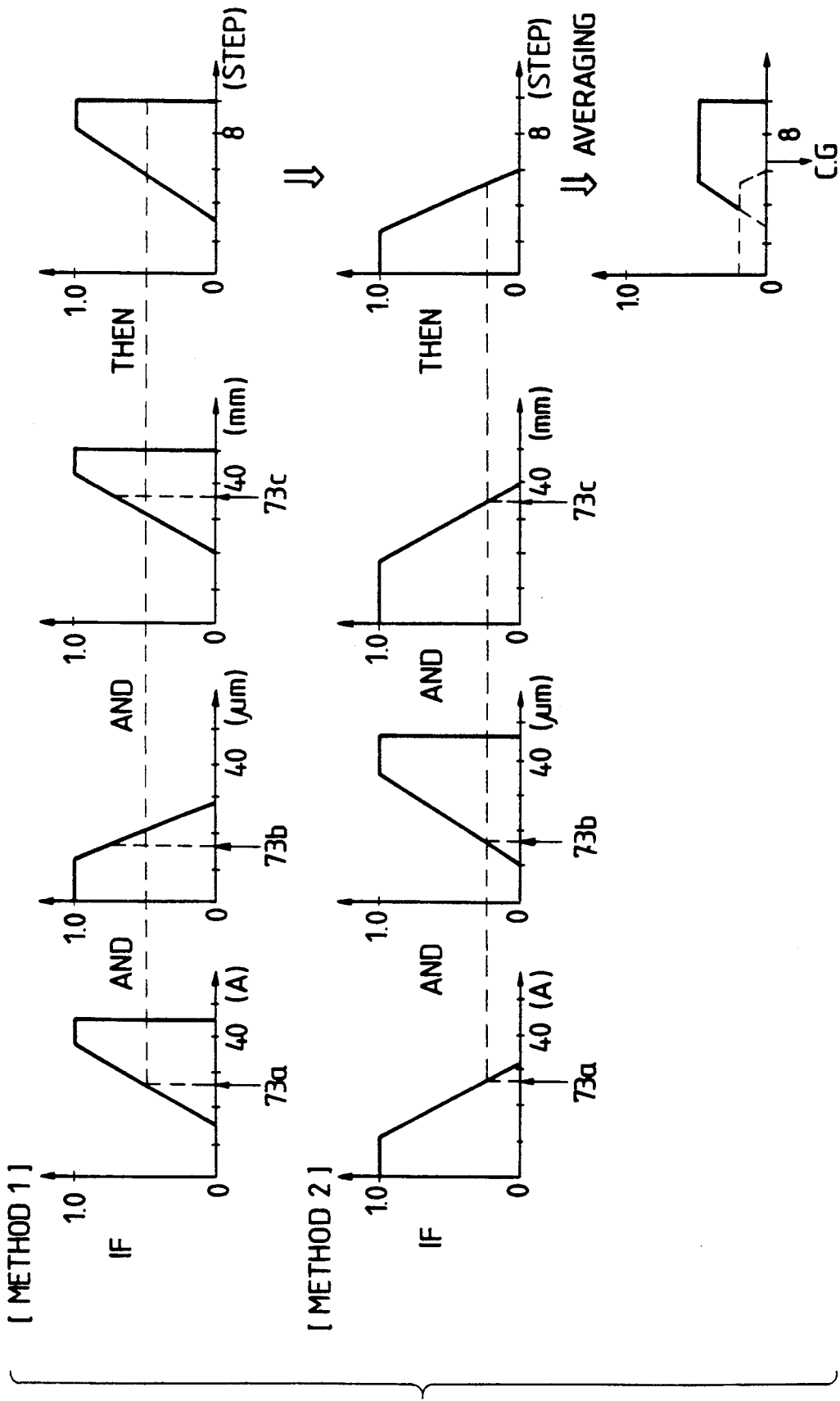
FIG. 16 is an explanatory diagram showing the process of fuzzy inference with respect to the methods shown in FIG. 14.

The inference section 43a performs a fuzzy inference according to a procedure shown in FIG. 16 according to the methods stored in the knowledge memory section 42a and the statuses stored in the status memory section 41a, to determine an instruction value 75 for the most suitable jumping operation of the machining electrode. In FIG. 16, reference characters 73a, 73b and 73c designate the known data and detection values of the machining current, clearance and machining depth stored in the status memory section 41a, respectively. With the fuzzy inference, in each method it is detected to what extent these status data 73 satisfy the qualitative expressions in the front condition part described with the membership functions, and the upper limit of the membership function of the rear condition part is cut to the value of the membership function which is minimum in the degree of satisfaction in the front condition. And the resultant membership functions are combined so as to have the largest of the function values of the given membership functions at all times, and the area gravity center position C.G. of the composite of the membership function is obtained. This is the instruction value 75 for the most suitable jumping operation of the machining electrode.

In FIG. 16, in each method, the front condition part describes three machining status, while the rear condition part one jumping operation data; however, the invention is not limited thereby or thereby. It goes without saying that, in the case where the number of methods is increased, an instruction value for the best jumping operation of the machining electrode can be obtained similarly. For the third embodiment of the invention, changing the jumping operation suitably according to the degree of instability of the discharging machining state has not been described; however, the changing of the jumping operation can be realized similarly as in the above-described case.

In the above-described third embodiment of the invention, the fuzzy set is utilized for the knowledge memory section and the fuzzy inference is performed by the inference section. However, it goes without saying that a knowledge expression and inference method utilized for other general expert systems can be utilized in the invention with the same effects as in the third embodiment.

Figure 17:
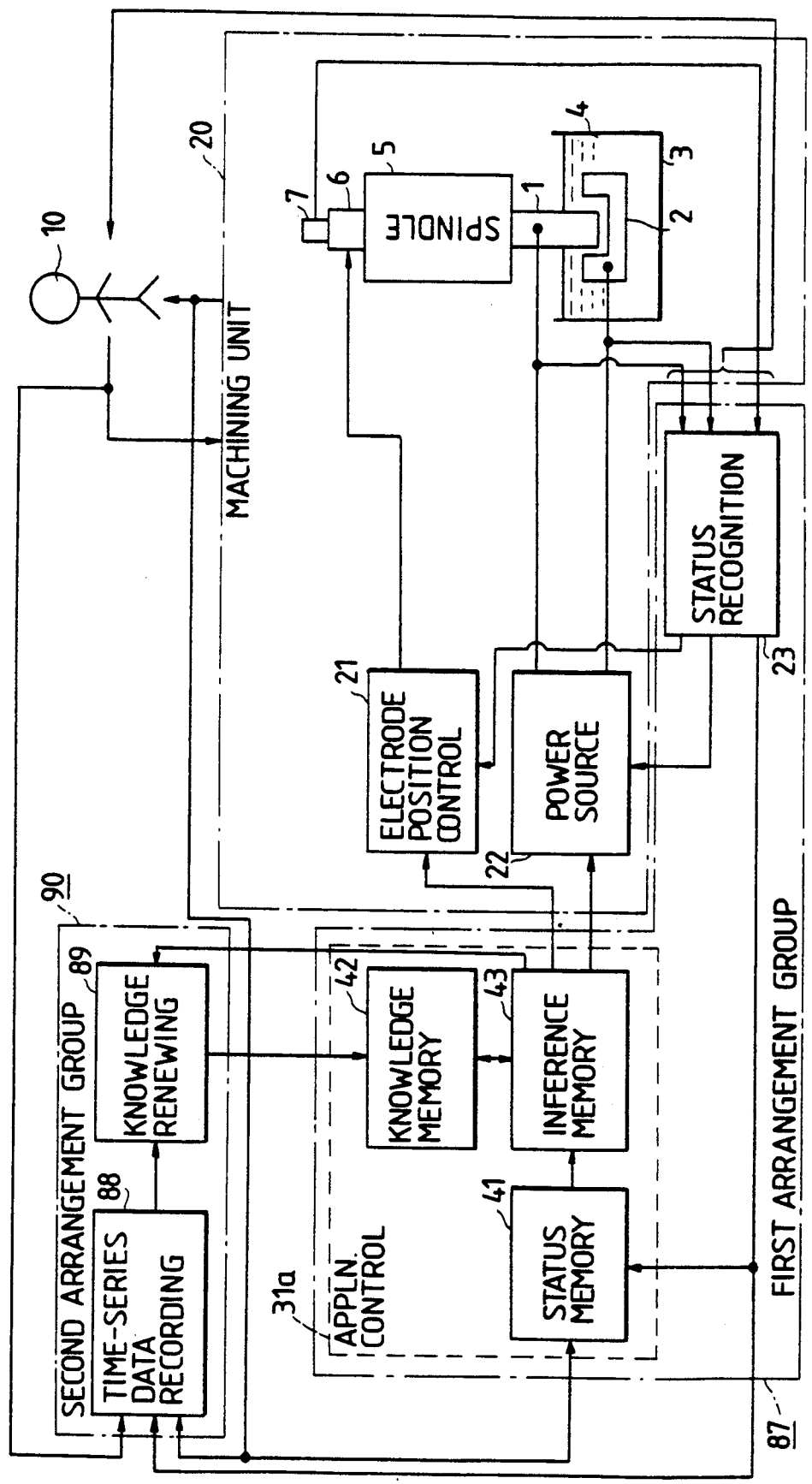
FIG. 17 is a block diagram showing the arrangement of a machining unit application control apparatus, a fourth embodiment of the invention.

Now, a fourth embodiment of the invention will be described. FIG. 17 is a block diagram showing the arrangement of the fourth embodiment, a machining unit application control apparatus. In FIG. 17, reference numeral 10 designates an operator; 20, a machining unit; 42, a knowledge memory section in which operator's machining methods are stored; 23, a state recognizing section for recognizing machining states; 41, a status memory section for storing machining conditions set for the machining unit 20 and machining states recognized by the state recognizing section 23; 43, an inference section for inferring the operation of the machining unit 20 from the machining statuses stored in the status memory section 41 using the machining methods stored in the knowledge memory section; and 87, a first arrangement group including the above-described sections 23, 41, 42 and 43. Further in FIG. 17, reference numeral 88 designates a time-series data recording section for recording time series data of the machining states recognized by the state recognizing section 23, the machining conditions set for the machining unit 20 and the operations performed by the operator 10; 89, a knowledge renewing section for extracting a machining method from the contents stored in the time-series data recording section 88 and combining it with the output of the inference section 43 to form a machining a method or correct it, thereby to renew the contents of the knowledge memory section 42; and 90, a second arrangement group consisting of the above-described sections 88 and 89.

The operation of the apparatus thus organized will be described. In machining an Al material with a machining unit 20, a method for adjusting a machining condition A as shown in the part (a) of FIG. 18, which is practiced by the operator 10, is stored in the knowledge memory section 42 as shown in the part (b) of FIG. 18.

As shown in a flow chart of FIG. 20, upon start of a machining operation, it is determined whether or not the machining operation has been ended (Step S41), and the state recognizing section processes the output signal of a sensor installed on the machining unit 20 to detect the machining speed and the machining sound magnitude, thereby to recognize the machining state (Step S42). The machining speed and the machining sound magnitude together with the machining conditions are stored, as a machining status, in the status memory section 41 (Step S43). The inference section 43 infers a machining condition changing operation from the machining status using a method stored in the knowledge memory section 42 (Step S44). For instance, in the case where, with respect to predetermined reference values, machining sound 3/2, machining speed 1 and condition B4 are obtained, $K_1 = -\frac{2}{3}$, $K_2 = -1$ and $K_3 = 4$ according to the table shown in the part (b) of FIG. 18, and therefore $$\begin{aligned}\text{(operation)} &= K_1 \text{ (machining speed)} + \\ &\quad k_2 \text{ (machining sound)} + K_3 \\ &= (-2/3 \cdot 1) - (1 \cdot 3/2) + 4 \\ &= 11/6\end{aligned}$$

Thus, the machining condition A is set to [11/6]. The above-described operation will become more apparent from the part (c) of FIG. 18, being indicated by three-dimensional functions, machining speed, machining sound and operating data.

That is, the machining unit application control apparatus controls the machining unit 20 according to the operator's machining method using the first arrangement group, thus repeatedly carrying out Steps S41 through S44 until the machining operation is accomplished.

Now, an operation of correcting the operator's machining method stored in the knowledge memory section 42 will be described.

Figure 21:
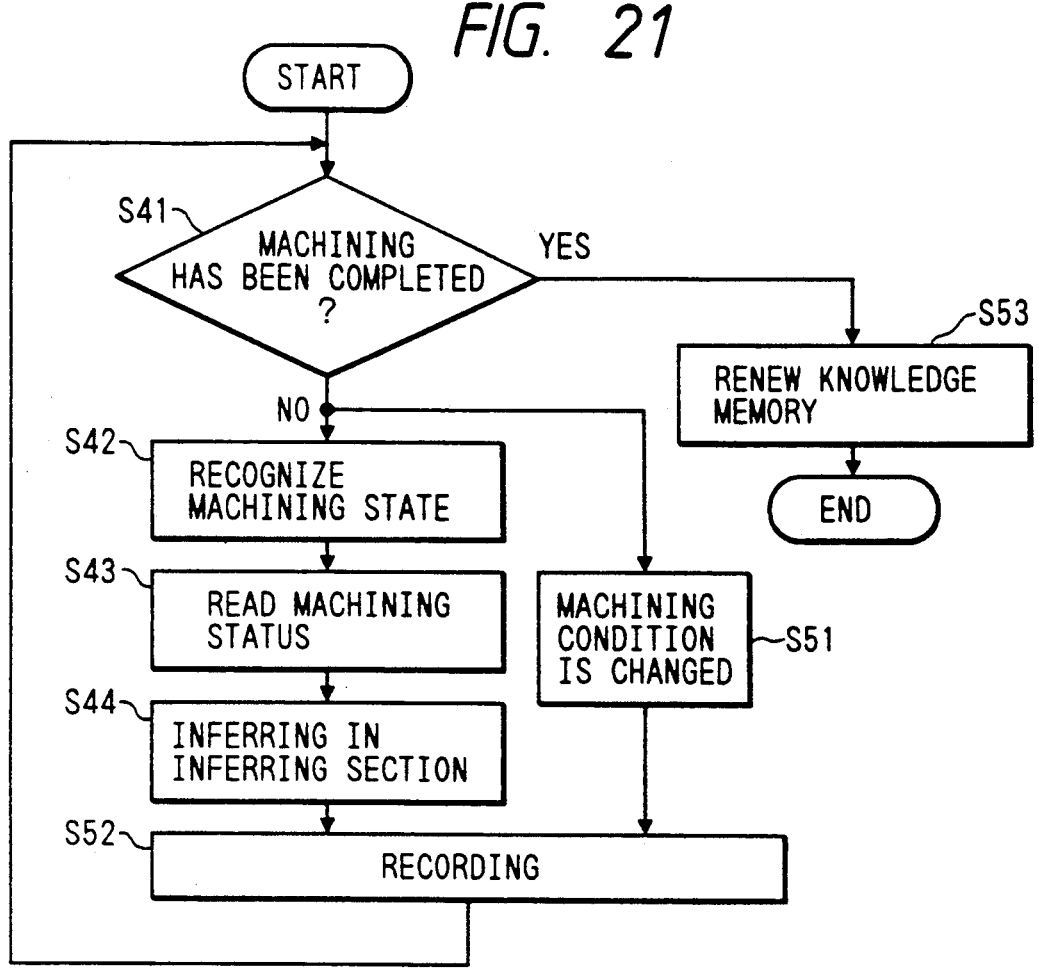
Figure 28:
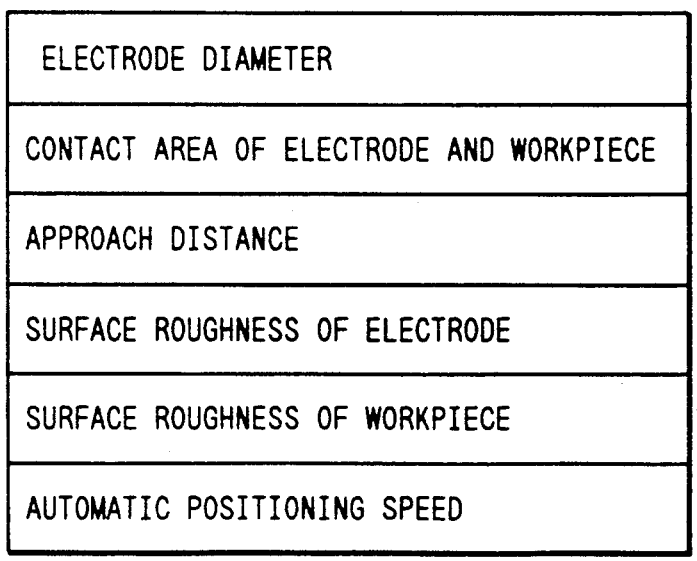

As shown in a flow chart of FIG. 21, during machining, part or all of the machining condition is changed (Step S51), and the time-series data recording section 88 is operated to record time-series data of the set machining conditions, machining states, and machining condition changing operation performed by the operator (Step S52). When the machining conditions are changed by the operator, the output of the inference section 43 is also recorded (Step S52). Thereafter, after the machining operation, the knowledge renewing section 89 corrects the machining method stored in the knowledge memory section 42 if the machining condition selected by the operator differs from that which is inferred by the inference section 43 (Step S53).

This will be concretely described with reference to FIG. 19. It is assumed that as a result of the machining of an Al material whose condition B is 3, the contents of the time-series data recording section 88 is as shown in the part (a) of FIG. 19. In this case, since the output (inference value) of the inference section 43 is different from the operation of the operator, the machining method is amended as follows: That is, the amendment is carried out according to the method of least squares. In the case where the operation is represented by y, the machining speed $u_1$, and the machining sound magnitude $u_2$, the machining method can be expressed as follows:

$$y = K_1 u_1 + K_2 u_2 + K_3 \tag{1}$$

Owing to the recording of the operation of the operator, $$(y_i, u_{1i}, u_{2i}) \ (i = 1, 2, \ldots \text{ and } 6) \tag{2}$$

With $$e_i = K_1 u_1 + K_2 u_2 + K_3 - y_i \tag{3}$$

$K_1$, $K_2$ and $K_3$ are obtained which minimizes the following equation (4) and are stored in the knowledge memory section 42:

$$\sum_{i=1}^{6} e_i^2 \tag{4}$$

By partial differentiation of equation (4) with respect to $K_1$, $K_2$ and $K_3$, $$\frac{\delta \Sigma e_i^2}{\delta K_1} = \Sigma 2 u_{1i} \cdot (K_1 \cdot u_{1i} + K_2 \cdot u_{2i} + K_3 - y_i) = 0 \tag{5}$$

$$\frac{\delta \Sigma e_i^2}{\delta K_2} = \Sigma 2 u_{2i} \cdot (K_1 \cdot u_{1i} + K_2 \cdot u_{2i} + K_3 - y_i) = 0 \tag{6}$$

$$\frac{\delta \Sigma_i^2}{\delta K_3} = \Sigma 2 \cdot (K_1 \cdot u_{1i} + K_2 \cdot u_{2i} + K_3 - y_i) = 0 \tag{7}$$

From equations (5), (6) and (7), $$K_1 = -1, K_2 = -3/2, \text{ and } K_3 = 7 \tag{8}$$

The contents of the knowledge memory section 42 are renewed using equation (8). That is, the contents of the knowledge memory section 42 are changed from those shown in the part (b) of FIG. 18 into those shown in the part (b) of FIG. 19. Thus, the machining method of the operator has been amended.

Now, an operation of collecting the machining methods of the operator and adding them to the contents of the knowledge memory section will be described with reference to the case where machining methods concerning the machining of a Cu material are collected. Similarly as in the above-described case of correcting an Al material machining method, the time-series data recording section 88 is operated to record time-series data of set machining conditions, machining states, operations done by the operator, and machining conditions inferred by the inference section 43, and the knowledge memory section 89 operates $K_1$, $K_2$ and $K_3$ in equation (1) according to the method of least squares.

The machining methods thus collected are stored in the knowledge memory section 42. This operation is greatly different from the above-described operation of correcting the machining method as follows: In the latter operation, the values stored are renewed, whereas in the latter operation, a region for storage is reserved, and the machining methods are stored in the region thus reserved. The machining methods of the operator are collected in the above-described manner. Thus, the operation of adding the machining methods to the contents of the knowledge memory section 42 has been accomplished.

In the above-described embodiment, only one operator is employed. When more than one operators are used, more than one knowledge memory sections 42 may be provided so that the operators are assigned to those sections, respectively; or one knowledge memory section 42 may be divided into more than one part so that the operators are assigned to those parts, respectively. In this case, the operator can store his own machining method in his own knowledge memory section 42.

In the case where operators' data are provided separately according to the operators, the names of the operators or personal data corresponding thereto are stored in the knowledge memory section 41 by using a keyboard, IC card, magnetic card, magnetic disk or optical disk.

In the invention, the machining unit may be an electric discharge machine, laser beam machine, beam machine, electrochemical machine, NC machine, or NC machine tool. In each machining unit, the same effects as those in the above-described fourth embodiment can be obtained with the signals changing with machining state applied to the state recognizing section 23.

Figure 22:
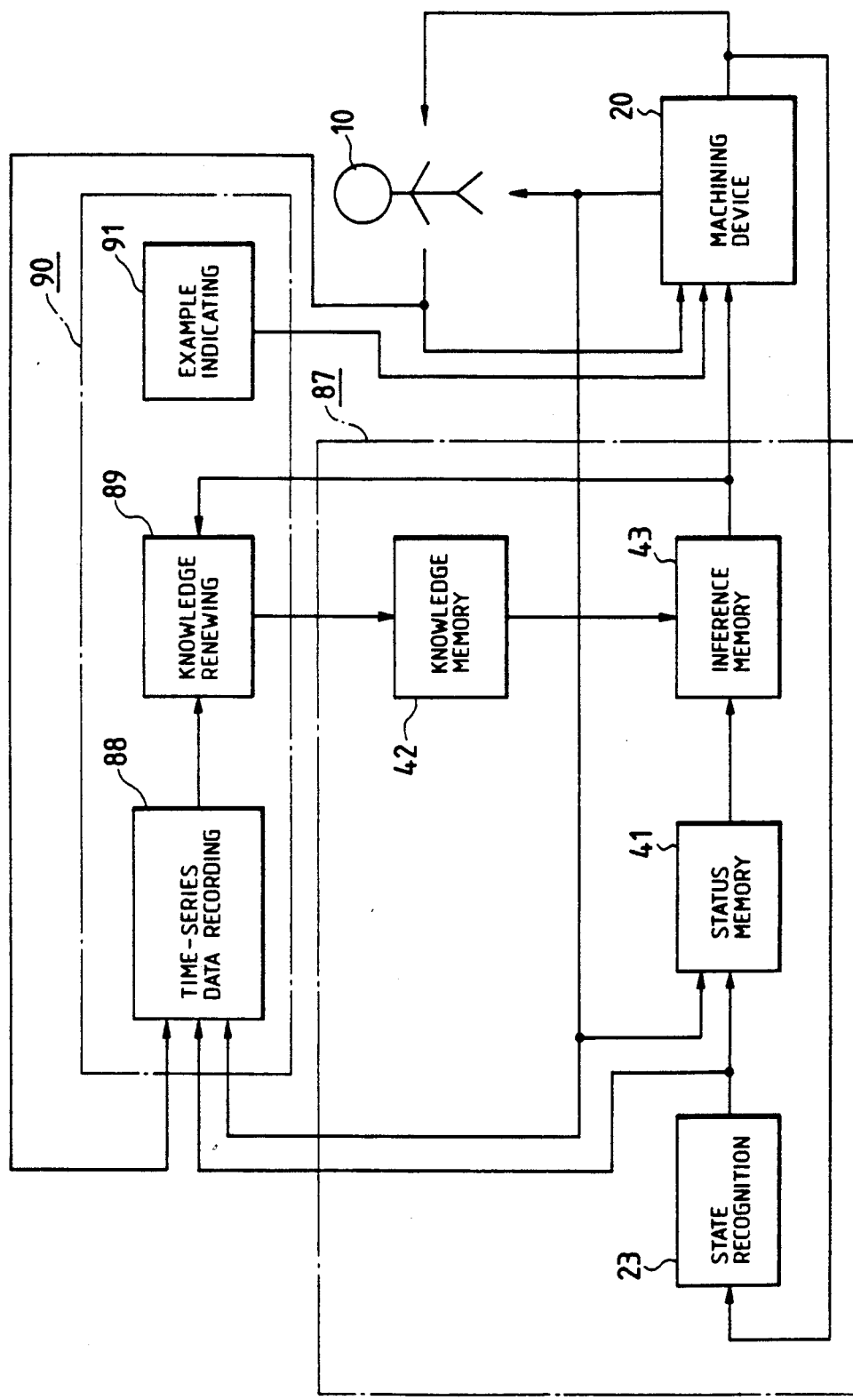
FIGS. 22, 23 and 24 are block diagrams showing arrangements of machining unit application control apparatuses which are fifth, sixth and seventh embodiments of the invention, respectively.
Figure 23:
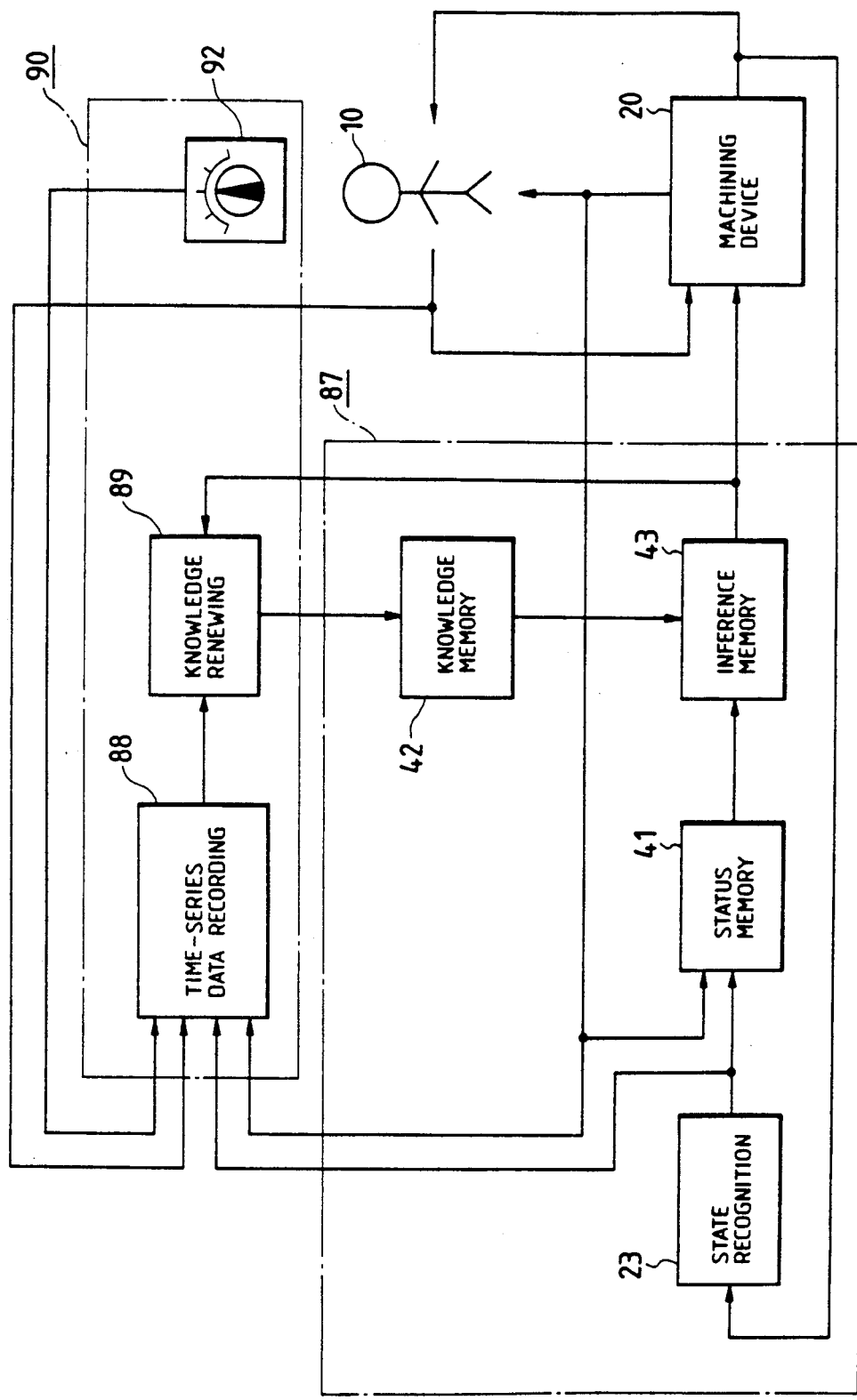
Figure 24:
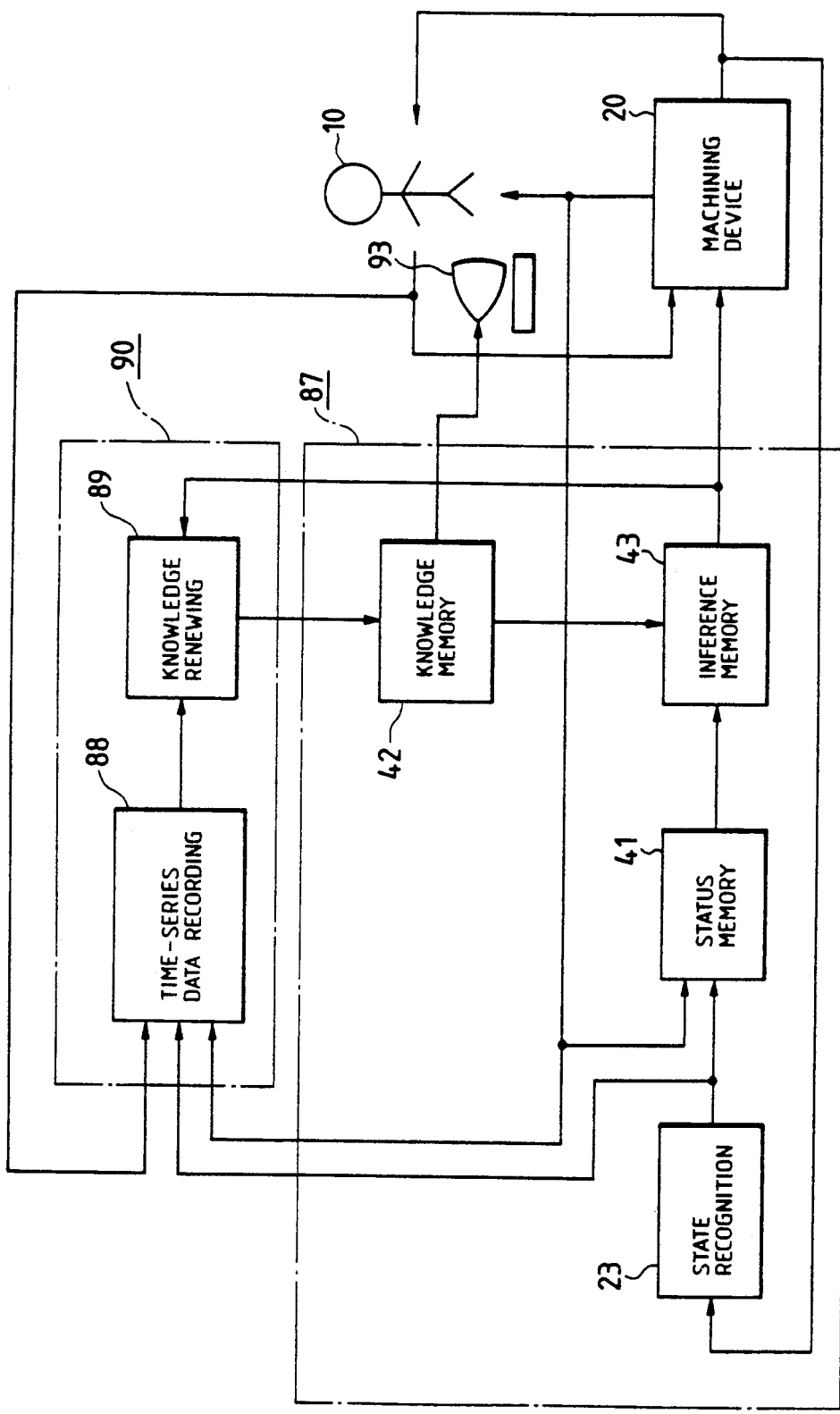

FIGS. 22, 23 and 24 are block diagrams showing fifth, sixth and seventh embodiments of the invention, machining unit application control apparatuses, respectively.

In the fifth embodiment shown in FIG. 22, an example indicating section 91 is provided in the second arrangement group. In the embodiment, the example indicating section 9 provides a machining example, and how to handle the machining example by the operator is recorded in the time-series data recording section 88. More specifically, in the case where the operator collects or correct machining methods, an example machining operation is carried out by using the first arrangement group 87 and the second arrangement group 90; that is, the operator is allowed to change part or all of the machining conditions without using the output of the inference section 43, so that the machining method stored in the knowledge memory section 42 are renewed by the knowledge renewing section 89. Hence, the machining methods of the operators can be positively collected.

Part or all of the machining method to be stored in the knowledge memory section 42 may be made up of a rule (IF—, THEN—) which consists of a front condition part including conditions to be determined and a rear condition part including the contents which are to be carried out when the conditions are satisfied and when not satisfied.

In addition part or all of the rule may be a fuzzy rule which is expressed on the fuzzy set theory which handles fuzzy expressions such as for instance "amplitude is large" and "move down a little". In this case, membership functions for a fuzzy set employed for expression of the front and rear condition parts, and the relationships between the membership functions are stored in the knowledge memory section 42, and fuzzy composition is carried out by the inference section 43 to combine a plurality of results from the machining states and machining conditions stored in the status memory section 41 and from the fuzzy rule concerning them stored in the knowledge memory section 42, whereby machining conditions for desirable machining states are obtained.

In this case, the apparatus may be so modified that the machining methods in the knowledge memory section 42 are corrected by changing the membership functions.

In the sixth embodiment shown in FIG. 23, a rotary knob 92, which the operator can freely operate, is provided in the second arrangement group so that analog data are inputted into the time-series data recording section. In the sixth embodiment, the quantity the operator feels can be inputted. Therefore, when the operator employs a method that "machining conditions are changed when machining sound is large, the degree to which he feels a machining sound large can also be recorded. Thus, the machining methods can be more positively collected.

In the above-described sixth embodiment, the rotary knob 92 is employed to input analog data; however, it may be replaced with a slide knob or joy stick switch. The positions of the knob or switch are detected by a potentiometer or rotary encoder (not shown) and applied through an A/D (analog-to-digital) encoder or up-down counter (not shown) to the time-series data recording section 88.

The above-described input device may have a plurality of push buttons, so that at least one of the following items is inputted by depressing at least one push button:

(a) The start of a machining condition changing operation which is to be carried out (b) The completion of a machining condition changing operation, which has been achieved by the operator (c) The self-evaluation of a machining condition changing operation which has been performed by the operator (d) The cancellation of a machining condition changing operation which has been achieved by the operator (e) The reason why the operator has performed a machining condition changing operation In the seventh embodiment shown in FIG. 24, a CRT display unit 93 is provided. In the embodiment, the machining methods stored in the knowledge memory section 42 can be displayed, so that it can be determined whether or not collection or correction of the machining methods has been positively performed. Instead of the CRT display unit 93, a liquid crystal panel or plasma display may be employed. With the display means, at least one of the following items (a) through (g) is displayed:

(a) Machining conditions (b) Outputs of the knowledge renewing section 89

(c) Renewal of the methods in the knowledge memory section 42

(d) Status of inference by the inference section 42

(e) Any one or all of the methods stored in the knowledge memory section 42

(f) Contents stored in the time-series data memory section 88

(g) Operator's name, or personal data corresponding thereto

When the example indicating section 81 outputs an example, the provision of the example is indicated on the display means such as a CRT display unit so as to allow the operator to confirm the operating status of the machining unit.

Similarly as in the second embodiment, the knowledge memory section 42 may be so designed that it is removable. In this case, one and the same knowledge memory section 42 can be used in common by a plurality of machining units equal in type, and therefore these machining units can perform machining operations according to the same machining method. In this case, the memory medium may be a magnetic disk, optical disk, IC card, IC cartridge, magnetic bubble memory, and magnetic tape.

In the above-described embodiment, with respect to the machining condition and machining status used for the inference of the inference section, simple application control can be achieved even if the machining conditions are not sufficient; that is, the simple application control can be performed only with machining conditions such as machining speed and machining sound.

The term "machining state" as used herein is intended to mean data representing a machining state which is provided by a detector.

The term "machining condition" as used herein is intended to means data such as set values and target values which affect machining operations.

The term "machining status" or "status" as used herein is intended mean both of the machining state and machining condition.

As was described above, in the prior art, the machining operation is performed according to the simple method, and in order to realize an intricate method, it is necessary to describe a considerably complicated method. On the other hand, according to the first aspect of this invention, by writing methods such as machining know how techniques in the knowledge memory section independently of the inference section, addition and modification of the methods can be readily achieved. In addition, in the invention, the operating data provided by the inference mechanism according to a plurality of methods are combined, so that an intricate application control can be readily realized with a variety of factors taken into account.

According to the second aspect of the invention, methods such as machining know how techniques are independently written in the knowledge memory section according to a predetermined rule, as a result of which addition and modification of the methods can be achieved more readily, and use of the knowledge memory section in common makes it possible to control the machining know how techniques with ease and to use them in common.

According to the third aspect of the invention, a method effective in jumping the machining electrode is stored in the knowledge memory section, machining status data necessary at least for the method is stored in the status memory section, and the inference section determines a jumping instruction value from the method stored in the knowledge memory section and the machining status data stored in the status memory section. Hence, the skilled operator's methods of jumping the machining electrode can be stored with ease, and according to those methods suitable execution and change of the jumping operation can be automatically achieved.

According to the fourth aspect of the invention, the application control apparatus is so designed that operator's machining methods can be utilized for automatic machining operations, which contributes to labor saving. Furthermore, in the application control apparatus, for the same reason the operators' machining methods can be collected or corrected with ease.

Figure 25:
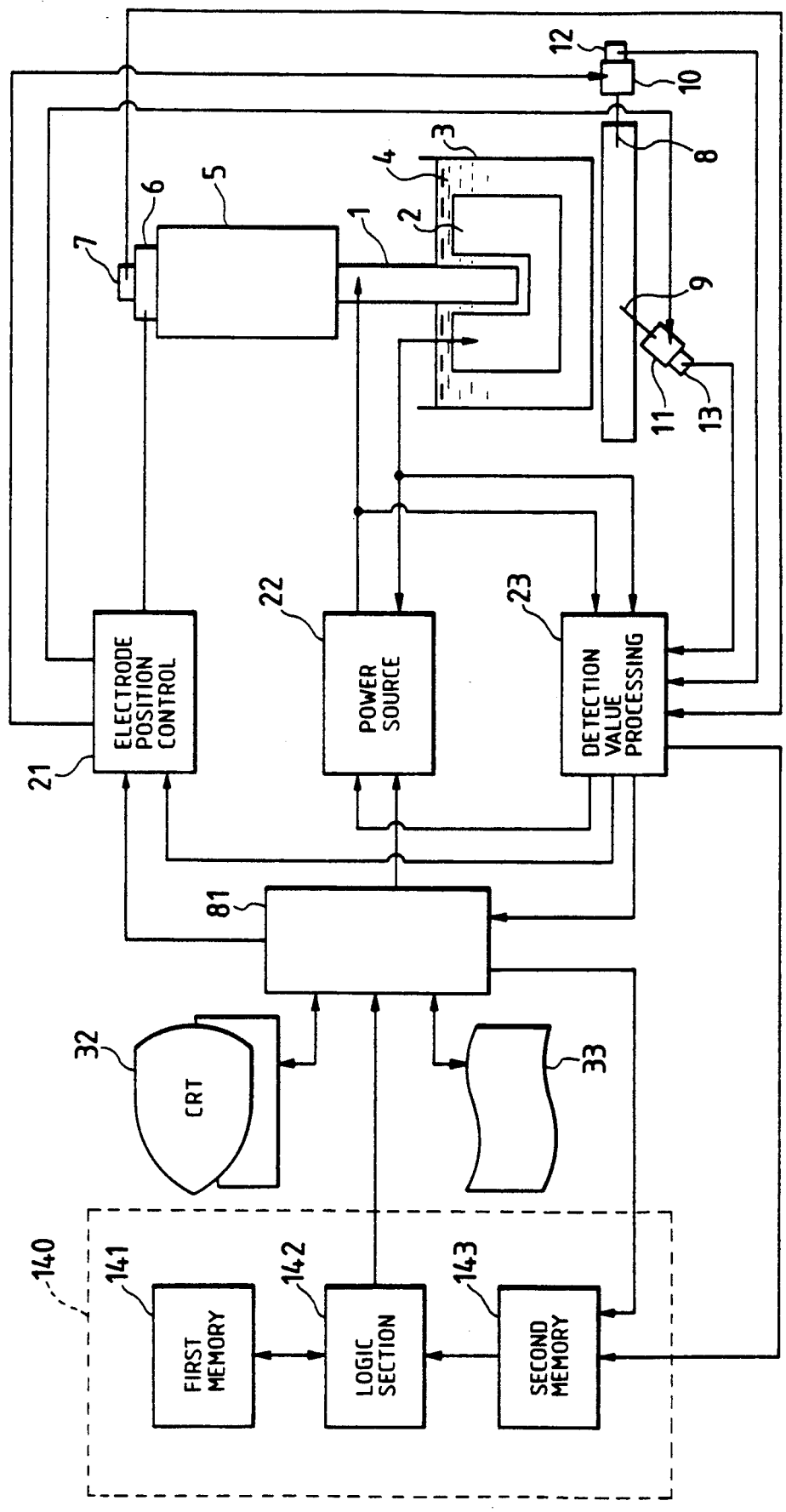

Another embodiment of the invention will be described with reference to FIG. 25. In FIG. 25, reference numerals 1 through 33 designate the same components or functions as those in FIG. 5 (the conventional apparatus); 140, an automatic positioning control unit; 141, a first memory section for storing a positioning procedure, and a method of determining whether or not the result of an automatic positioning operation is acceptable; 143, a second memory section for storing the status of the electrode 1 and the workpiece 2 which are to be position-controlled, and the status of an automatic positioning operation; and 142, a logic section.

Figure 26B:
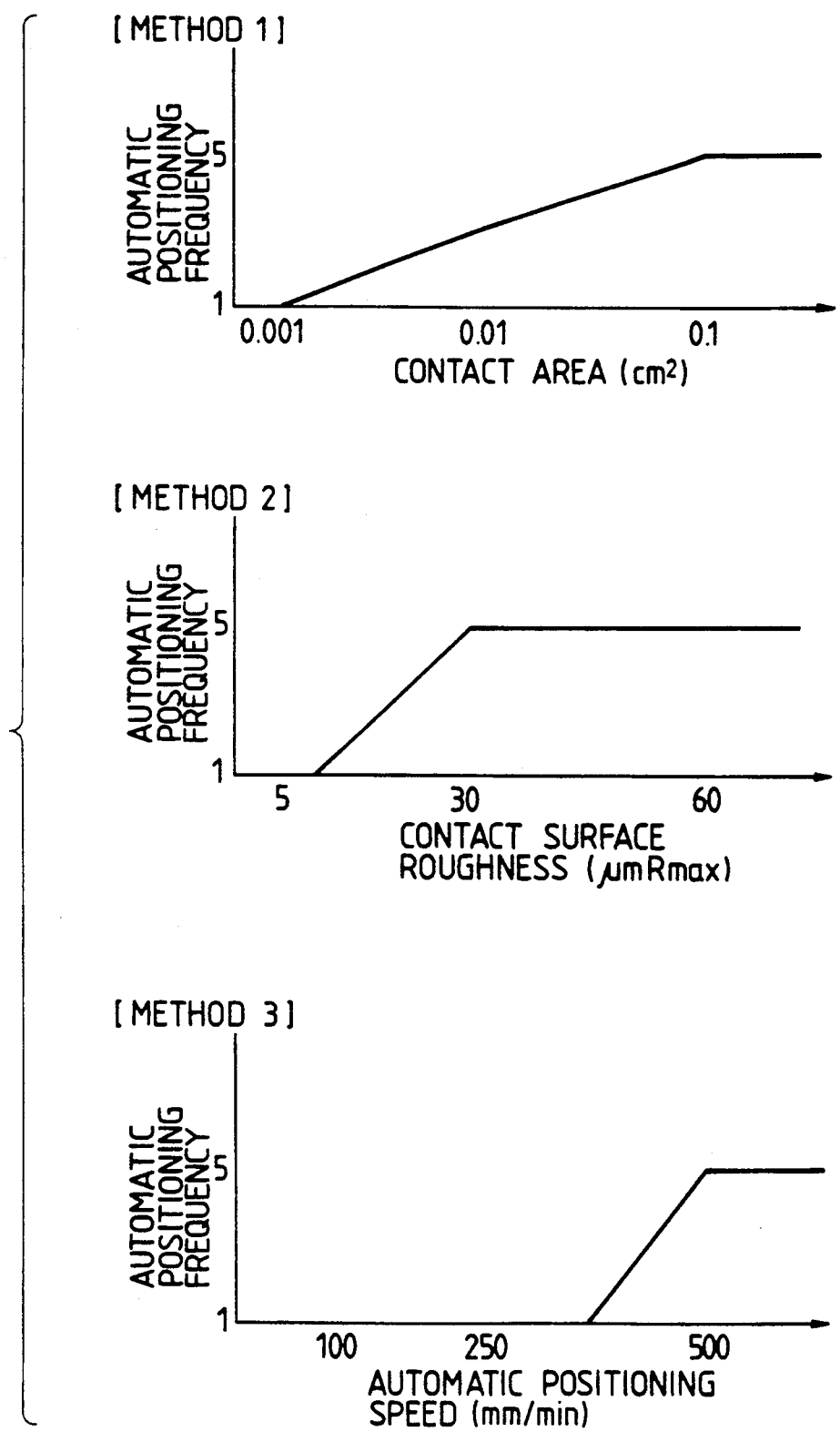
Figure 29:
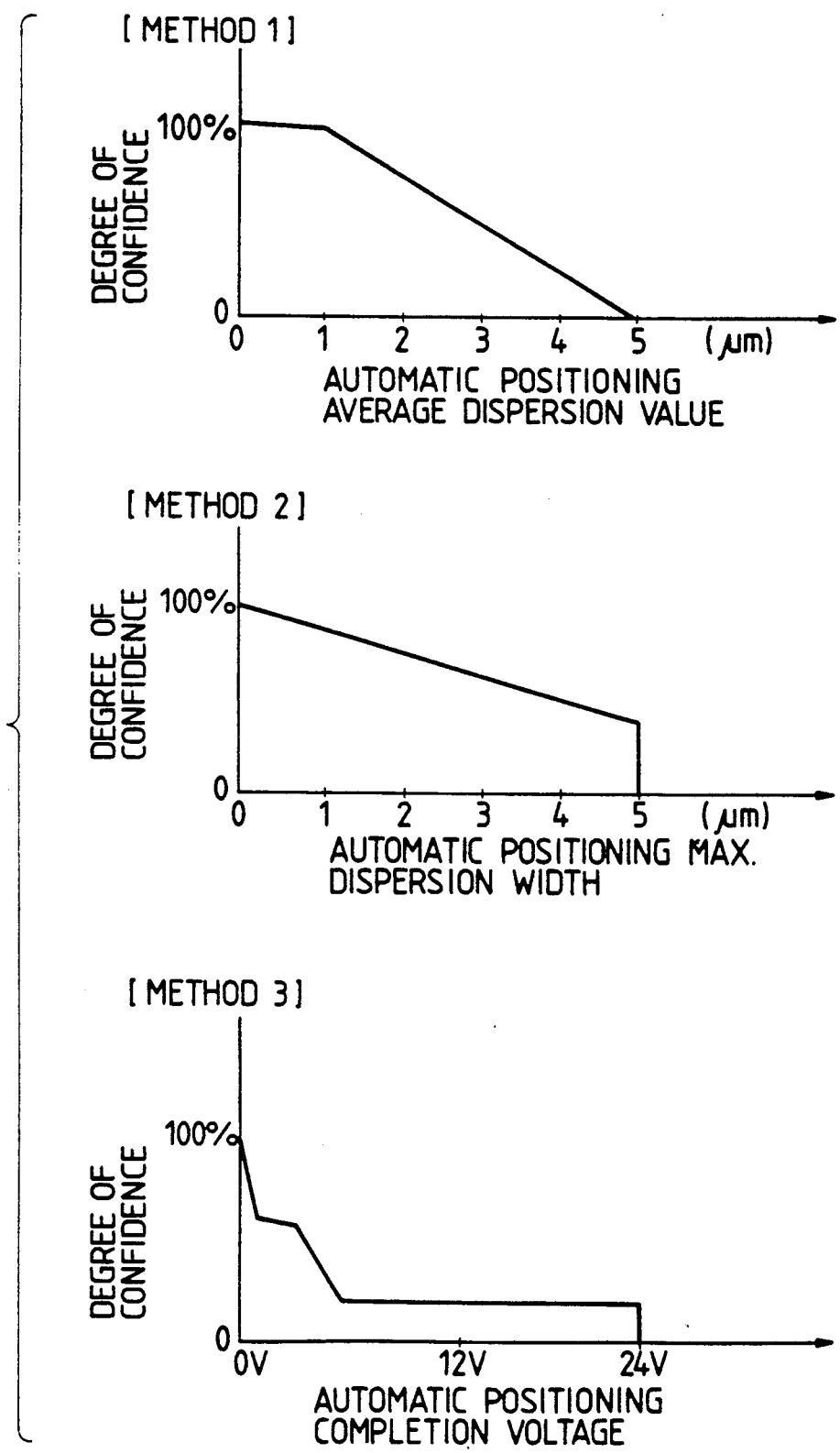

The operation of the application control apparatus thus organized will be described. A plurality of methods have been stored in the first memory section which is adapted to store a positioning procedure and a method of determining whether or not the result of an automatic position operation is acceptable. More specifically, a plurality of method of determining an automatic positioning speed and an automatic positioning frequency as shown in the parts (a) and (b) of FIG. 26 are stored in the first memory section 141, and in addition a plurality of methods of determining an automatic positioning operation completion position from the result of an automatic positioning operation as shown in FIG. 29 are stored in the first memory section 141. In the part (a) of FIG. 26, method 1 is to determine an automatic positioning speed according to an electrode diameter. More specifically, the automatic postioning speed is determined in several steps in such a manner that the automatic positioning speed is extremely high for an electrode small in diameter, and it is extremely low for an electrode large in diameter. In method 2, an automatic positioning speed is determined according to a contact area. That is, the automatic positioning speed is determined in several steps in such a manner that it is extremely low in the case where the contact area is small, and it is extremely high in the case where the contact area is large. In method 3, an automatic positioning speed is determined according to the distance of movement in the automatic positioning operation; i.e., an approaching distance. More specifically, the automatic positioning speed is determined in several steps in such a manner that it is extremely high in the case where approaching distance is long, and the automatic positioning operation is started with the electrode far from the workpiece, and it is extremely low in the case where the approaching distance is short, and the automatic positioning operation is started with the electrode near to the workpiece.

In the part (b) of FIG. 26, method 1 is to determine an automatic positioning frequency according to a contact area. More specifically, the automatic positioning frequency is determined in several steps in such a manner that the automatic positioning operation is performed only once for the electrode which is small in contact area, or has a sharp tip, and the automatic position operation is carried out several times for the electrode which is large in contact area. In method 2, an automatic positioning frequency is determined according to a contact surface roughness. More specifically, the automatic positioning operation is carried out only once for the electrode whose contact surface is high in surface roughness as in a mirror, and it is carried out several times for the electrode whose contact surface is low in surface roughness as in an electrode used for discharge machining operations. In method 3, an automatic positioning frequency is determining according to an automatic positioning speed. That is, the automatic positioning operation is carried out several times in the case where the automatic positioning speed is high, and it is carried out only once in the case where the automatic position speed is low. The above-described methods of determining an automatic positioning speeds and automatic positioning frequencies are operator's know how techniques, which are stored in the first memory section 141.

Figure 27:
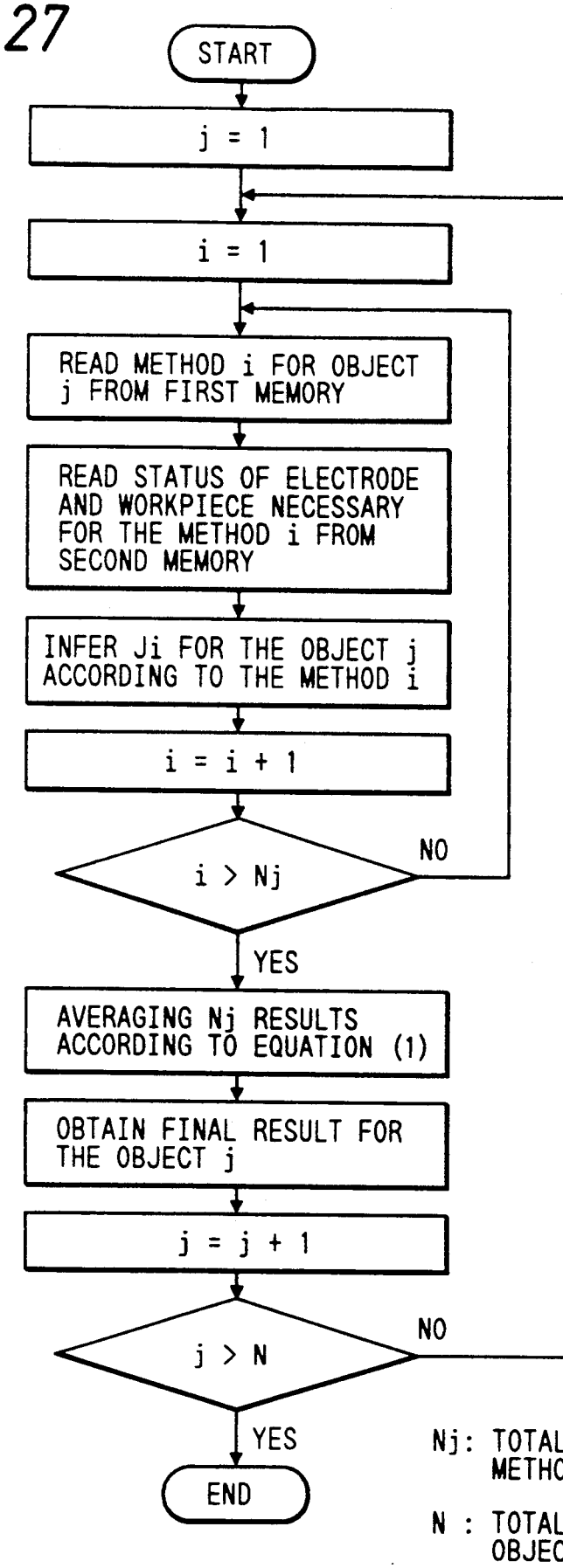

FIG. 27 is a flow chart showing a method of determining most suitable automatic positioning speeds and automatic positioning frequencies according to the methods stored in the first memory section 141 and to the status of an electrode and a workpiece to be automatically positioned which is stored in the second memory section 143 with the aid of the logic section 142. First, the logic section 142 reads method 1 from the first memory section 141 to determine an automatic positioning speed $F_1$ according to the electrode diameter area stored in the second memory section 143. It reads method 2 to determine an automatic positioning speed $F_2$ according to the contact area stored in the second memory section 143. Similarly, it determines an automatic positioning speed $F_3$. The three automatic positioning speeds thus determined are combined to obtain a final automatic positioning speed Ft. The composition of the speed Ft can be achieved by averaging those results for instance as follows:

$$Ft = \frac{1}{N} \sum_{k=1}^{Nj} Fk \quad (1)$$

where Nj is the total number of methods for an object j.

Thereafter, method 1 for another object is read, so that an automatic positioning frequency $T_1$ is determined according to the contact area stored in the second memory section 143. Next, method 2 is read, so that an automatic positioning frequency $T_2$ is determined according to the contact surface roughness stored in the second memory section 143. Similarly, an automatic positioning frequency $T_3$ is obtained according to method 3 read out. The three automatic positioning frequencies thus determined are combined to obtained a final automatic positioning frequency Tt. The composition of the frequency Tt can be achieved by averaging those result similarly as in the above-described equation (1):

$$Tt = \frac{1}{N} \sum_{k=1}^{Nj} Tk \quad (1)'$$

where Nj is the total number of methods for an object j.

Under this condition, the status of the electrode and the workpiece is read from the second memory section 143. The electrode diameter, the contact area of the electrode and the workpiece, the distance between the electrode and the workpiece at the start of an automatic positioning operation (i.e., the approaching distance), the surface roughness of the electrode and the workpiece, and the automatic positioning speed determined according to the above-described equation (1) are stored in the second memory section 143. Those data have been set in advance.

Figure 30:
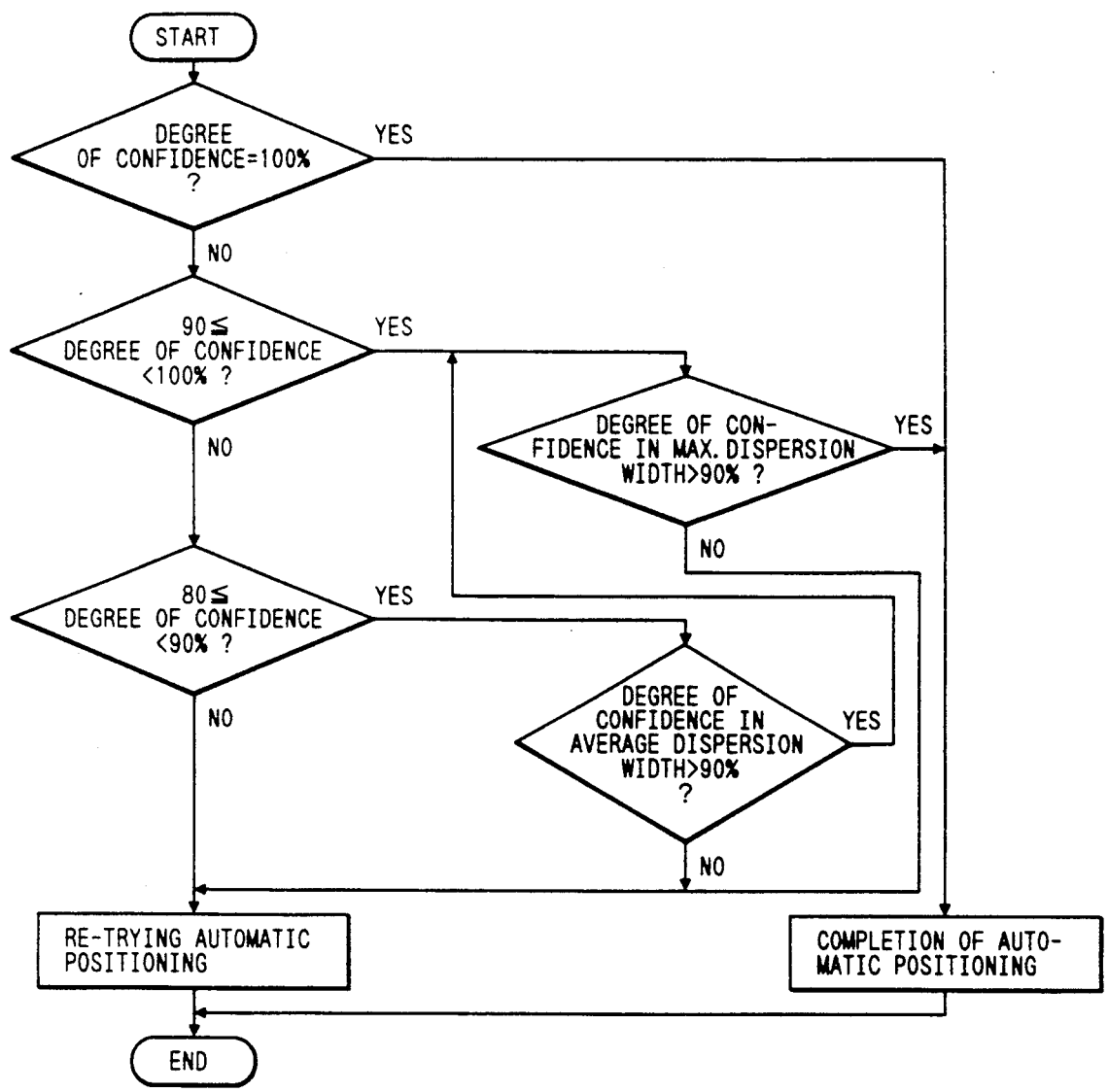

An automatic positioning operation is carried out with the automatic positioning speed and frequency thus obtained, as a result of which an automatic positioning operation completion position is obtained. More specifically, the position of completion of the automatic positioning operation is obtained by using a plurality of methods which are stored in the first memory section 141 as shown in FIG. 29. In FIG. 29, method 1 is used to determine a degree of confidence in the completion position according to an automatic positioning average dispersion value. In method 2, a degree of confidence in the completion position is determined according to an automatic positioning maximum dispersion width. In method 3, a degree of confidence in the completion position is determined according to a voltage at the completion of the automatic positioning operation. That is, when the electrode is in contact with the workpiece, the degree of confidence that the position of the electrode is the automatic positioning operation completion position is extremely high; whereas when the electrode is spaced apart from the workpiece, and the voltage is developed across the inter-electrode, the degree of confidence is extremely low. The logic section 142 determines a degree of confidence in the automatic positioning operation completion position from the methods stored in the first memory section 142 and the results of automatic positioning operations stored in the second memory section 143. The determination is carried out according to a method which is equivalent to that which is shown in the flow chart of FIG. 27. According to the degree of confidence thus determined, the automatic positioning operation completion position is determined according to a flow chart of FIG. 30.

In the above-described embodiment, the first memory section 141 stores the method of determining an automatic positioning speed by using three method of obtaining automatic positioning speeds from three factors, electrode diameter, contact area and approaching distance, respectively, and the method of determining an automatic positioning frequency by using three methods of obtaining automatic positioning frequencies according to three factors, contact area, contact surface roughness and automatic positioning speed, respectively. However, the detection may be carried out by using a degree of environmental contamination in air or oil, or the electrical conductivity of the electrode or workpiece. Furthermore, a method of determining the voltage from these factors which is applied during the automatic positioning operation.

In the above-described embodiment, the logic section 142 employs equation (1) for combination of the results obtained according to the methods; however, the composition may be achieved according to a variety of methods using weighted mean, maximum value, minimum value, etc.

The first memory section, the second memory section, and the logic section may be formed according to the algorithm on inference which is written according to a fuzzy rule. In addition, the first memory section, the second memory section, and the logic section may be provided in the numerical control unit.

Furthermore, in the above-described embodiment, the electrode and workpiece positioning detecting means operates on electrical contact; however, physical contact type detecting means or non-contact type detecting means may be employed.

As is apparent from the above description, according to the invention, the methods such as positioning know how techniques, which can be practiced by a person, but are difficult to fix because the control model is intricate, are stored in the first memory section. Hence, addition and modification of the methods can be readily achieved. Furthermore, according to the invention, the logic section 142 operates to combine the results provided according to a plurality of methods, to provide the final result with a variety of factors taken into account. Thus, the automatic positioning operation can be achieved with higher stability and with higher accuracy.

Figure 31:
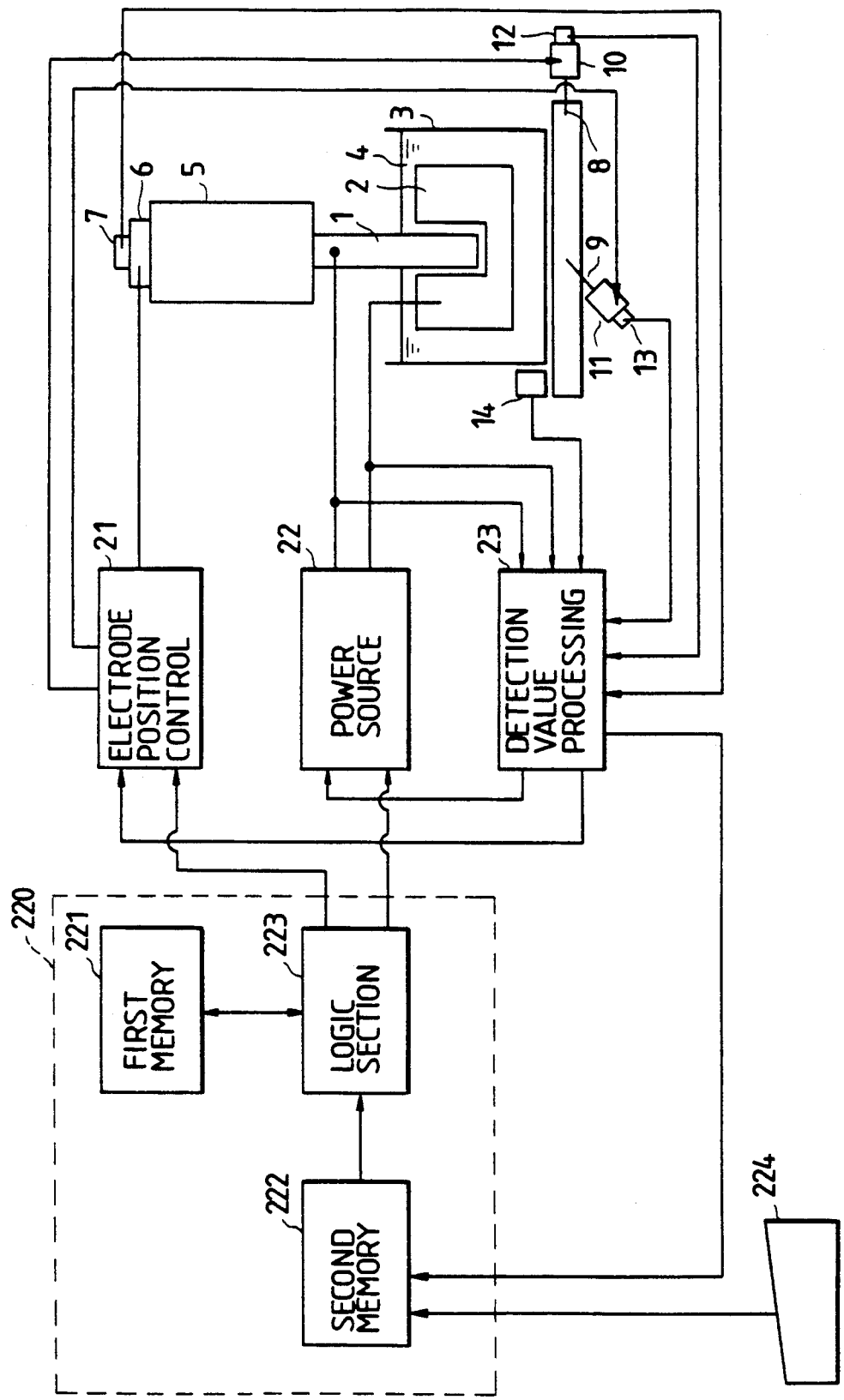
FIG. 31 is a block diagram showing an electric discharge machining operation completion determining apparatus, another embodiment of the invention.

Another embodiment of the invention will be described. FIG. 31 is a block diagram showing the embodiment, a machining operation completion determining unit. In FIG. 31, reference numeral 1 designates an electrode; 2, a workpiece to be machined; 3, a machining vessel; 4, a machining solution; 5, a Z-axis for moving the electrode 1 in such a manner that the latter 1 is pushed into the workpiece; 6, a Z-axis drive motor; 7, a detector for detecting the speed and position of the Z-axis 5; 8 and 9, an X-axis and a Y-axis for moving the electrode 1 and the workpiece relative to each other in directions perpendicular to the direction of the Z-axis 5, respectively; 10, an X-axis drive motor; 11, a Y-axis drive motor; 12, a detector for detecting the speed and position of the X-axis 8; 13, a detector for detecting the speed and position of the Y-axis 9; 14, a machining solution pressure meter; 21, an electrode position control section; 22, a machining electric power source; 23, a detection value processing section; and 220, the machining operation completion determining unit. The unit 220 comprises: a first memory section 221 which stores a plurality of methods concerning detection and analysis of machining environmental factors such as machining solution jet pressure, machining area, machining depth and oscillation radius; a second memory section which stores present and/or past machining state and machining environment; and a logic section 223 for combining a plurality of results provided according to the machining state and machining environment stored in the second memory section 222 and the plurality of methods stored in the first memory section 221, to obtain a correct machining operation completion determining parameter, thereby to perform a machining operation completion determination. Further in FIG. 31, reference numeral 224 designates input means such as a keyboard.

The operation of the machining operation completion determining unit thus constructed will be described. The parts (a), (b) and (c) of FIG. 32 show the methods concerning detection and analysis of machining environmental factors which are stored in the first memory section 221; more specifically, a plurality of methods of determining the range of difference Ve between an electric discharge machining voltage and a reference voltage which is one of the machining operation completion determining parameters.

Figure 32A:
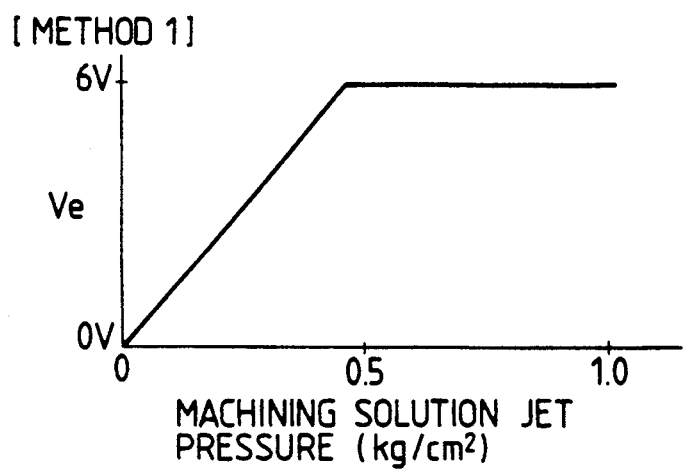
FIGS. 32a–32c are explanatory diagrams showing one method of detecting and analyzing the machining environmental factors stored in a first memory section; more specifically, examples of a method of obtaining a range of difference between discharge machining voltage and reference voltage which is one of the machining operation completion determining parameters.
Figure 32B:
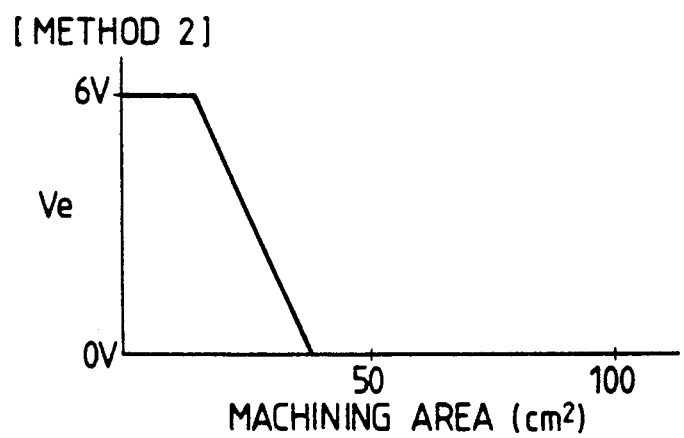
Figure 32C:
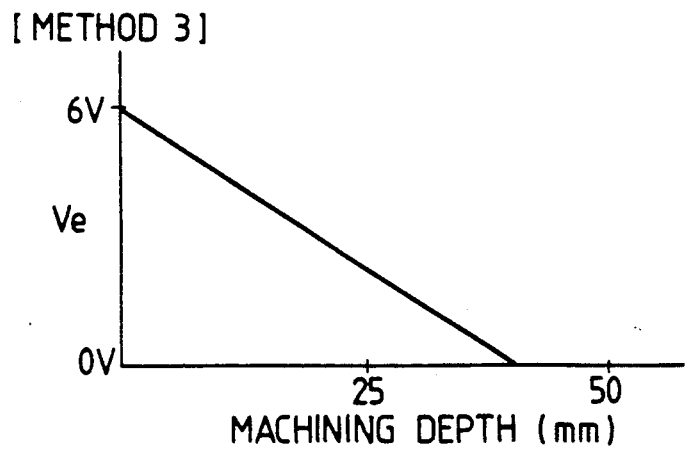

In method 1 shown in the part (a) of FIG. 32, the data Ve is determined according to machining solution jet pressure. When the machining solution jet pressure is 0; i.e., no machining solution jet is provided, Ve is 0V. That is, it is regarded that, when the machining operation is carried out normally, the range of difference Ve, the machining operation completion determining parameter, is satisfied. When the machining solution jet pressure is 0.5 kg/cm$^2$, Ve is 6 V. That is, it is regarded that, when the completely open state is obtained, the machining operation completion determining parameter Ve is satisfied. This is based on the fact that the inter-electrode gap between the electrode and the workpiece is large when no machining solution jet is provided, whereas it is small when the machining solution jet is provided.

In method 2 shown in the part (b) of FIG. 32, the data Ve is determined according to a machining area. Where a machining area is small, waste material such as sludge is distributed, and it is removed with high efficiency; and therefore it is regarded that, when the completely open state is obtained, the machining operation completion determining parameter is satisfied. On the other hand, when the machining area is large, then the waste material is non-uniformly distributed, and it is difficult to remove, and therefore the inter-electrode gap between the electrode and the workpiece is large. Accordingly, in this case, it is regarded that, when Ve is 0; i.e., when the machining operation is carried out normally, the machining operation completion determining parameters is satisfied.

In method 3 shown in the part (c) of FIG. 32, the data Ve is determined according to a machining depth. In the case where the machining depth is small, waste material such as sludge can be removed with high efficiency, and therefore it is regarded that, when the completely open state is obtained, the machining operation completion determining parameters is satisfied. When, on the other hand, the machining depth is large, then the waste material become difficult to remove, and the inter-electrode gap between the electrode and the workpiece becomes large; and therefore it is regarded that, when Ve is 0V; i.e., when the machining operation is carried out normally, the machining operation completion determining parameters is satisfied.

Figure 33A:
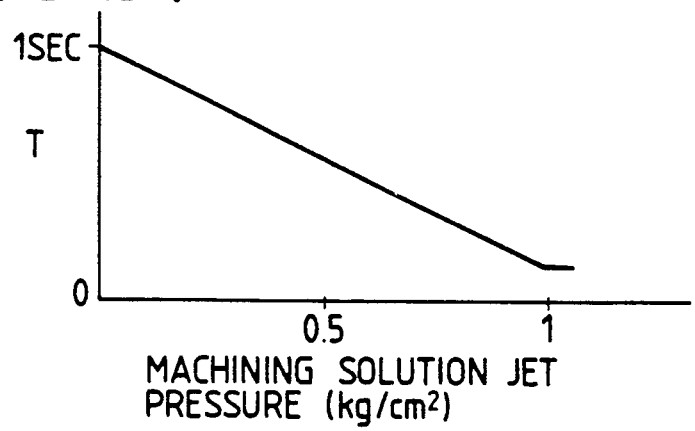
FIGS. 33a–33c are explanatory diagrams showing another method of detecting and analyzing the machining environmental factors stored in the first memory section; more specifically, examples of a method of obtaining a duration time within the range of difference which is another of the machining operation completion determining of parameters.
Figure 33B:
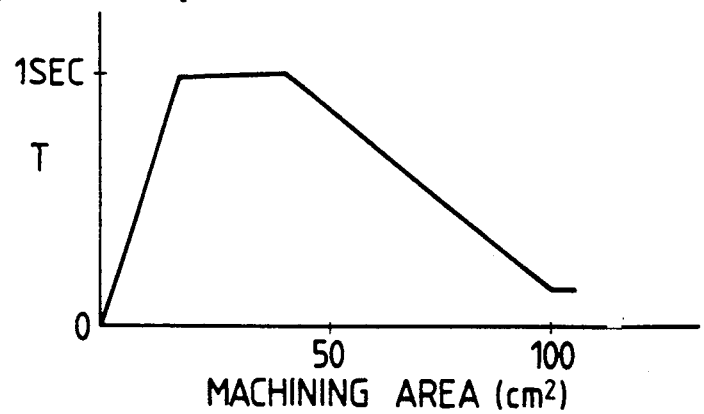
Figure 33C:
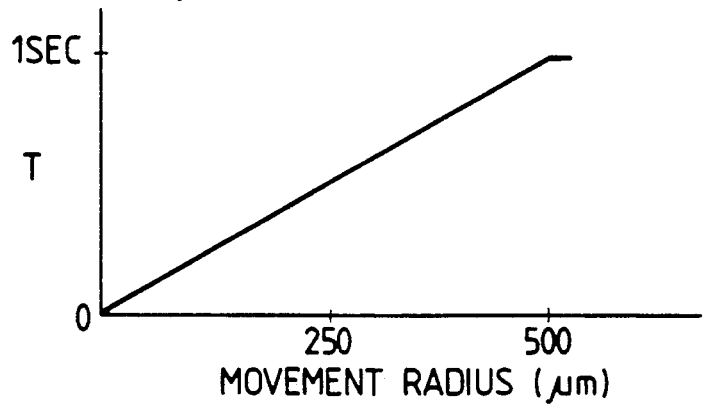

The parts (a), (b) and (c) of FIG. 33 show methods of determining the duration time T within the range of difference Ve between a discharge machining voltage and a reference voltage which is another one of the machining operation completion determining parameter.

In method 1 shown in the part (a) of FIG. 33, the time T is determined according to a machining solution jet pressure. When no machining solution jet is applied, Ve is 0V as was described before, and therefore it is regarded that, when the machining operation is performed stably for one second, the duration time within Ve is satisfied. When, on the other hand, the machining solution jet is used, Ve is 6V, and therefore it is useless to set the duration time to a value larger than required; that is, it is regarded that, when the machining operation is carried out stably for a period of time which is long enough, the machining operation completion determining parameter T has been met.

In method 2 shown in the part (b) of FIG. 33, the time T is determined according to a machining area. For instance, in the case where a small hole is formed, the amount of machining is small, and accordingly the time T may be short. On the other hand, as a machining area increases, the amount of machining is increased, and therefore T is set to one second in order to confirm that a machining operation is stable within Ve. However, when a machining area is extremely large, it is rather difficulty to remove the waste material such as sludge formed. This difficulty may be eliminated by increasing T. However, increasing T makes it difficult to determine whether or not the machining operation has been accomplished. Hence, in contrast, the time T is decreased.

In a method 3 shown in the part (c) of FIG. 33, T is determined according to an oscillation radius. Where the oscillation radius is small, the total circumference of oscillation can be determined with a short duration time T; whereas where the oscillation radius is long, the total circumference of oscillation cannot be determined without a long duration time T.

Figure 34:
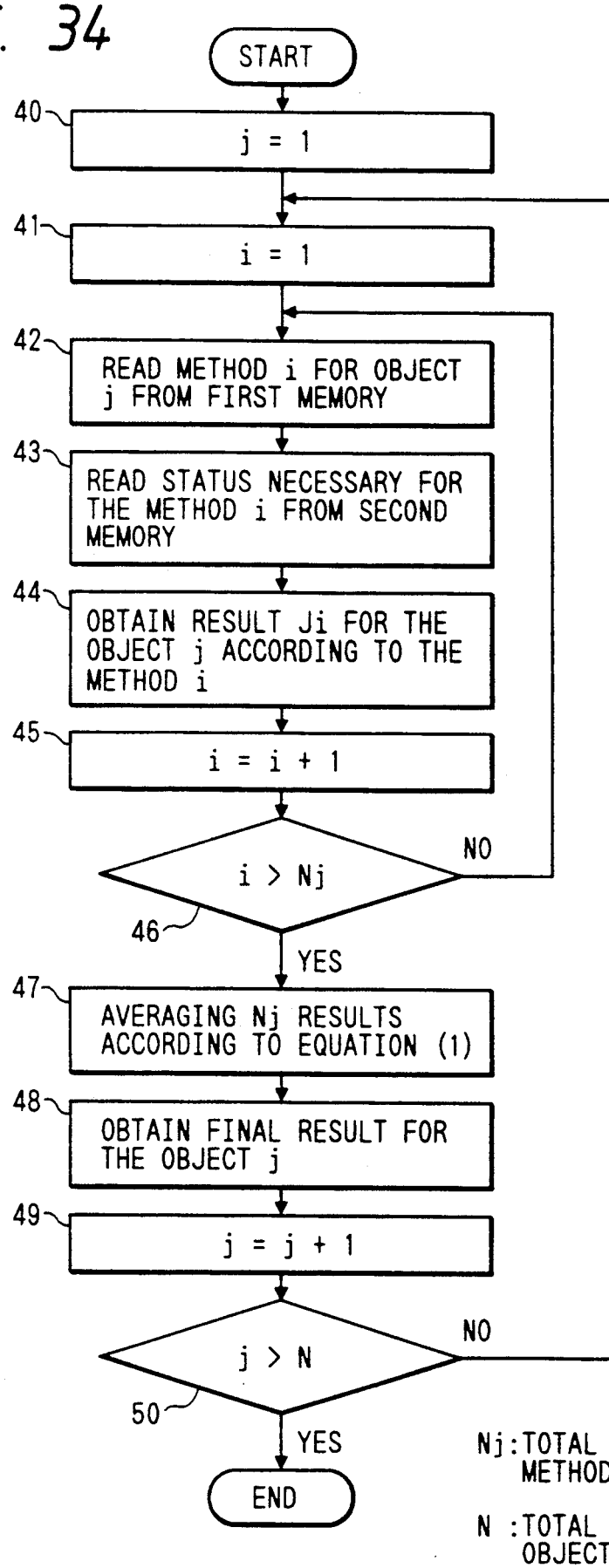
FIG. 34 is a flow chart for a description of a method of obtaining machining operation completion determining parameters by a logic section.

FIG. 34 is a flow chart for a description of a method in which the logic section 223 determines the range of difference Ve between discharge machining voltage and reference voltage and the duration time T within the range of difference Ve, which are the machining operation completion determining parameters, according to the methods stored in the first memory section 223 and the machining environmental conditions such as machining solution jet pressure, machining area, machining depth and oscillation radius which are stored in the second memory section 222.

First, with j=1 and i=1 in Steps 40 and 42, the logic section 223 reads object 1; that is, method 1 concerning the range of difference Ve between discharge machining voltage and reference voltage, which is one machining operation completion determining parameter, from the first memory section 221 (Step 42). In Step 43, the logic section reads a machining environmental condition concerning method 1; i.e., the machining solution jet pressure, from the second memory section 222, and utilizes the machining solution jet pressure thus read to obtain a range of difference Ve1 between discharge machining voltage and reference voltage according to method 1 (Step 44).

Next, in Step 45, the logic section reads method 2 concerning Ve, and, similarly as in the above-described case, utilizes the machining area stored in the second memory section 222 to obtain a range of difference Ve2 between discharge machining voltage and reference voltage according to method 2 (Step 44). Similarly, a range of difference Ve3 is obtained according to method 3. In Step 46, it is determined whether or not all the methods have been used for the object.

The results provided by the three methods are combined (Step 47) to obtain a range of difference Ve between discharge machining voltage and reference voltage is obtained (Step 48). The composition is performed, for instance, by averaging those results according to the following equation (1):

$$Ve = \frac{1}{Nj} \sum_{k=1}^{Nj} Vek \quad (1)$$

where Nj is the total number of methods for an object j.

Thereafter, the object is switched over to another one (Steps 49 and 50). Method 1 concerning the new object; i.e., the duration time T within the range of difference Ve is read (Step 42), and the machining solution jet pressure stored in the second memory section 222 is utilized to obtain a duration time T1 within Ve according to method 1 (Step 44). Similarly as in the above-described case, method 2 is read, and the machining area stored in the second memory section 222 is utilized to obtain a duration time T2 within Ve according to method 2. Similarly, a duration time T3 is obtained according to method 3. The results provided by the three methods are combined (Step 47) to determined a duration time T within Ve (Step 48). This composition is performed by averaging those results according to the following equation (2):

$$T = \frac{1}{Nj} \sum_{K=1}^{Nj} Tk \quad (2)$$

where Nj is the total number of methods for an object j.

The above-described machining solution jet pressure, machining area, machining depth, and oscillation radius are stored in the second memory section 222 as follows: The machining solution jet pressure is stored as follows: In FIG. 31, the machining solution pressure meter 14 applies the pressure of the machining solution 4 to the detection value processing section 23, so that the machining solution pressure is stored in the second memory section. The machining area is stored as follows: That is, data inputted through the input means such as a keyboard by the operator is stored, as the machining area, in the second memory section 222. The machining depth is stored as follows: The output signal of the detector 7 for the speed and position of the Z-axis 5 is applied to the detection value processing section 23, where the amount of movement of the Z-axis with the machining electric power source 22 on; i.e., a machining depth is obtained. The machining depth thus obtained is stored in the second memory section 222. In the case of the oscillation radius, the output signals of the speed and position detectors 12 and 13 provided respectively for the X-axis 8 and Y-axis 9 are applied to the detection value processing section 23, where the maximum amounts of displacement of the X-axis and Y-axis are obtained, and stored, as the oscillation radius, in the second memory section 222.

Figure 35:
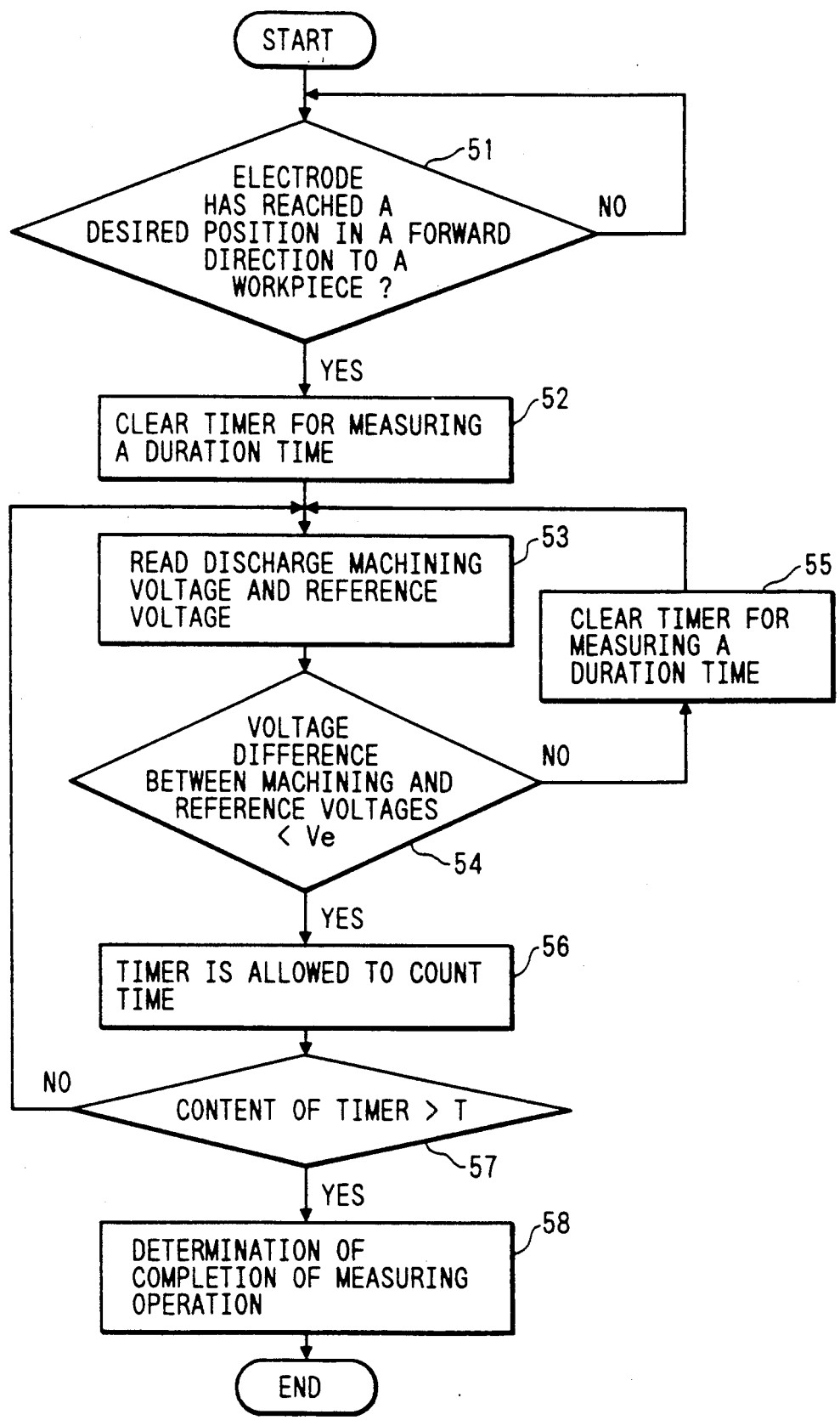
FIG. 35 is a flow chart showing a machining operation completion determining method practiced by the logic section.

The range of difference Ve between discharge machining voltage and reference voltage and the duration time T within the range of difference Ve are utilized for determination of the completion of the machining operation. This determination is carried out by the logic section 223 according to a flow chart of FIG. 35 as follows:

In Step 51, it is determined whether or not the electrode has reached a desired position in the direction in which it is pushed into the workpiece. The term "desired position" as used herein is intended to mean the position which is obtained when the difference between the position which is inputted through the input means 224 (FIG. 31) in advance and stored in the second memory section 222 and the position which the speed and position detector 7 applies as its output signal to the second memory section 22 through the detection value processing section 23 becomes zero. In Step 52, a timer for measuring a duration time T is reset. In Step 53, the discharge machining voltage and the reference voltage are read. The discharge machining voltage is stored as follows: That is, the inter-electrode voltage between the electrode 1 and the workpiece 2 is detected by the detection value processing section 23 (FIG. 31), and it is stored, as the discharge machining voltage, in the second memory section 222. The reference voltage is inputted through the input means 224 and stored in the second memory section 222 in advance. In Step 54, the difference between the discharge machining voltage and the reference voltage is compared with the range of difference Ve described above. When the difference is not within the range of difference Ve, in Step 55 the duration time measuring timer is reset. When the former is within the latter, in Step 56, the timer is allowed to count time. When, in Step 57, the content of the timer exceeds T, then it is regarded that the determination of the completion of the machining operation has accomplished (Step 58).

In the above-described embodiment, the range of difference Ve between discharge machining voltage and reference voltage, and the duration time T within the range of difference Ve are employed as the machining operation completion determining parameters; however, they may be replaced by an oscillating circulation frequency, or a range of distance for back-and-forth movement by inter-electrode voltage servo, and a duration time in the range of distance. Furthermore, in the above-described embodiment, a machining solution jet pressure, machining area, machining depth, and oscillation radius are employed as machining environmental conditions determining factors; however, instead, oscillation configurations, electrode configurations and machining conditions may be employed. The machining operation completion determining unit shown in FIG. 32 may be built in the electric discharge machine NC unit.

In the above-described embodiment, the combination of the results by the logic section 223 is carried out according to equations (1) and (2) which provide mean values; however, the composition may be achieved according to a variety of methods using weighted mean, maximum value, minimum value, etc.

The first memory section, the second memory section, and the logic section may be formed according to the algorithm on inference which is written according to a fuzzy rule.

As is apparent from the above description, according to the invention, a plurality of machining environmental factors are detected and analyzed to obtain machining operation completion determining parameters suitable for machining environmental conditions, so that the completion of the machining operation can be determined accurately according to those parameters, with a result that the workpiece is machined with high accuracy. In the invention, unlike the prior art in which a uniform machining operation completion determination is carried out indiscriminately, the machining time is effectively used; that is, the machining operation is carried out with high efficiency.

Furthermore, with the unit, the machining operation completion determining method is effectively practiced, the methods of detecting and analyzing the machining environmental factors are stored in the first memory section independently of the logic section, as a result of which addition, modification and correction of the methods can be achieved with ease.

INDUSTRIAL APPLICABILITY

This invention can be widely applied to machining units such as electric discharge machines.

We claim:

1. An application control apparatus for a machining unit in which machining conditions can be changed during machining, comprising:
    a knowledge memory section for storing a plurality of different methods of changing machining states;
    a status memory section for storing information representing at least one of present machining states, past machining states and machining conditions; and
    an inference section for combining a plurality of results obtained by said plurality of different methods, respectively, in accordance with the information stored in said status memory section, thereby providing optimal machining states, each of the stored plurality of different methods for changing machining states using information stored in said status memory section that is not used by any other method to change the same machining state;
    said machining conditions of said machining unit being changed in accordance with the optimal machining states.

2. The application control apparatus as defined in claim 1, wherein said inference section includes means for averaging the plurality of results obtained by said plurality of different methods to provide the optimal machining states.

3. An application control apparatus for a machining unit in which machining conditions can be changed during machining, comprising:
    a knowledge memory section for storing a plurality of different methods of changing machining states in a rule format including a front condition part which describes a condition to be determined and a rear condition part describing contents to be carried out when said front condition part is satisfied and when said front condition part is not satisfied;
    a status memory section for storing information representing at least one of present machining states, past machining states and machining conditions; and
    an inference section for combining a plurality of results obtained by said plurality of different methods, respectively, in accordance with the information stored in said status memory section, thereby providing optimal machining states, each of the stored plurality of different methods for changing machining states using information stored in said status memory section that is not used by any other method to change the same machining state;
    said machining conditions of said machining unit being changed in accordance with said optimal machining states.

4. The application control apparatus as defined in claim 3, wherein said inference section includes means for averaging the plurality of results obtained by said plurality of different methods to provide the optimal machining states.

5. An application control apparatus for a machining unit, comprising:
    a jump controlling unit for controlling a jumping operation of a machining electrode in a discharge machining operation;
    a knowledge memory section for storing a plurality of different methods for performing the jumping operation of said machining electrode;
    a status detecting unit for detecting machining status data necessary for the stored methods;
    a status memory section for storing information representing at least one of present machining states, past machining states and machining conditions detected by said status detecting unit; and
    an inference section for combining a plurality of results obtained by said stored methods in accordance with the information stored in said status memory section, thereby providing an optimal jumping operation, each of the stored different methods for performing the jump operation using information stored in said status memory that is not used by any other method to change the same machining state.

6. The application control apparatus as defined in claim 5, wherein said inference section includes means for averaging the plurality of results obtained by said plurality of different methods to provide the optimal machining states.

7. An application control apparatus for a machining unit in which machining conditions can be changed, said apparatus comprising:
- a first arrangement group comprising:
  - a knowledge memory section for storing a plurality of different methods of changing machining conditions;
  - a state recognizing section for detecting machining states and processing signals;
  - a status memory section for storing information representing at least one of machining states provided by said state recognizing section and set machining conditions; and
  - an inference section for obtaining optimal machining conditions according to the information stored in said status memory section and said methods stored in said knowledge section; and
- a second arrangement group comprising:
  - a time-series data recording section for recording time-series data of said set machining conditions, said machining states provided by said state recognizing section and machining condition changing operations performed by an operator; and
  - a knowledge renewing section for extracting a machining method from said recorded time-series data, and for modifying said methods stored in said knowledge memory section in accordance with said extracted machining method;
- said first arrangement group operable for changing said machining conditions of said machining unit according to machining conditions provided by said inference section;
- said first and second arrangement groups are used to perform a machining operation when performing at least one of collecting and correcting machining methods of an operator, said first and second arrangement groups also being operable to renew a method provided by said knowledge renewing section and stored in said knowledge memory section in accordance with, at least a part of the machining conditions by said operator without use of an output of said inference section.

8. A machining unit application control unit for an electric discharge machine which has a detector for detecting when a relative position of a machining electrode and a workpiece is equal to a predetermined value and is controlled by a numerical control unit, comprising:
- a first memory section for storing a plurality of different methods for controlling a speed at which an electrode and a workpiece move towards each other such that a relative position of said electrode and said workpiece can be detected, such that a frequency of the operation can be determined, and such that after detection of the relative position of said electrode and workpiece being equal to a predetermined value, said electrode and workpiece are moved away from each other, and then subsequently said electrode and workpiece are moved towards each other until said relative position is again equal to said predetermined value, said first memory section also storing
  - a plurality of methods of determining a true detection position from a fluctuation in the detection position;
- a second memory section for storing information representing state data of an electrode and a workpiece, and coordinates provided when the relative position of said electrode and said workpiece is equal to a predetermined value; and
- a logic section for combining a plurality of results obtained by said plurality of methods stored in said first memory section in accordance with the information stored in said second memory section, thereby determining at least one of a speed and frequency of moving said electrode and said workpiece towards each other, and whether the relative position of said electrode and said workpiece is equal to said predetermined value.

9. An electric discharge machining method in which an electrode and a workpiece are moved relative to each other in such a manner that said electrode is moved towards said workpiece, and a machining operation is carried out while a distance between said electrode and said workpiece in a direction of movement of said electrode is being maintained constant by a servo control, and while one of said electrode and workpiece is being oscillated in directions perpendicular to the direction of movement of said electrode, said method comprising:
- determining machining environmental factors including machining solution jet pressure, machining area, machining depth and oscillation radius to determine machining operation completion determining parameters, said parameters including a difference range between a discharge machining voltage and a reference voltage, and a time duration within said range of difference; and
- determining when a machining operation completion operation is carried out in accordance with whether said machining operation completion determining parameters are satisfied by detecting values provided during machining.

10. An electric discharge machine in which an electrode and a workpiece are moved relative to each other in such a manner that said electrode is moved towards said workpiece, and a machining operation is carried out while a distance between said electrode and said workpiece in a direction of movement of said electrode is maintained constant by a servo control, and while one of said electrode and workpiece is being oscillated in directions perpendicular to the direction of movement of said electrode, said machine comprising:
- a first memory section for storing a plurality of different methods for determining machining environmental factors, said factors including machining solution jet pressure, machining area, machining depth and oscillation radius;
- a second memory section for storing information representing at least one of present machining states, past machining states and machining environmental conditions; and
- a logic section for combining a plurality of results obtained by said plurality of methods stored in said first memory section in accordance with the information stored in said second memory section, to obtain a machining operation completion determining parameter, and to determine a machining operation completion according to said obtained parameter.

* * * * *